United States Patent
Gupta

(10) Patent No.: US 8,449,860 B2
(45) Date of Patent: May 28, 2013

(54) METHOD AND SYSTEM FOR RECOVERING SULFUR IN THE THERMAL STAGE OF A CLAUS REACTOR

(75) Inventor: Ashwani K. Gupta, College Park, MD (US)

(73) Assignee: University of Maryland, College Park, MD (US)

(*) Notice: Subject to any disclaimer, the term of this patent is extended or adjusted under 35 U.S.C. 154(b) by 15 days.

(21) Appl. No.: 13/127,364

(22) PCT Filed: Oct. 30, 2009

(86) PCT No.: PCT/US2009/062758
§ 371 (c)(1),
(2), (4) Date: Aug. 1, 2011

(87) PCT Pub. No.: WO2010/062682
PCT Pub. Date: Jun. 3, 2010

(65) Prior Publication Data
US 2011/0280795 A1 Nov. 17, 2011

Related U.S. Application Data

(60) Provisional application No. 61/110,709, filed on Nov. 3, 2008.

(51) Int. Cl.
*B01D 53/76* (2006.01)
*C01B 17/04* (2006.01)

(52) U.S. Cl.
USPC ............... 423/573.1; 423/576.8; 422/168; 422/177; 422/181

(58) Field of Classification Search
USPC ............... 423/573.1, 576.8; 422/168, 177, 422/181
See application file for complete search history.

(56) References Cited

U.S. PATENT DOCUMENTS

| | | | |
|---|---|---|---|
| 4,400,369 A | 8/1983 | Palm | |
| 6,042,803 A | 3/2000 | Watson | |
| 2011/0280795 A1* | 11/2011 | Gupta | 423/574.1 |

FOREIGN PATENT DOCUMENTS

| | | | | |
|---|---|---|---|---|
| FR | 2 540 974 | | 8/1984 | |
| FR | 2540974 A | * | 8/1984 | |

(Continued)

OTHER PUBLICATIONS

PCT International Search Report for PCT/US2009/062758, dated Feb. 11, 2010.

(Continued)

*Primary Examiner* — Timothy Vanoy
(74) *Attorney, Agent, or Firm* — Carter, DeLuca, Farrell & Schmidt, LLP

(57) ABSTRACT

Method and system are presented for the combustion of hydrogen sulfide mixed with other gases for simultaneous recovery of sulfur and energy from hydrogen sulfide at higher efficiency. The amounts and velocity of the hydrogen sulfide into the reactor is selected in such a way that it is not possible to burn the hydrogen sulfide in a normal thin reaction zone during its combustion. The injected hydrogen sulfide gas is mixed in a thermal reactor with fresh air and hot active combustion gases in the reactor on account of internal jet pump effect and self-induced entrainment. The reaction is exothermic so that the chemical energy present in hydrogen sulfide is recovered together with the sulfur. Various reactors are shown capable of controlling the formation of a thermal distribution flow pattern based on the position, and position and direction (and other factors) regarding fluid introduction within a combustion chamber of the reactors.

24 Claims, 21 Drawing Sheets

FOREIGN PATENT DOCUMENTS

GB 803475 A * 10/1958
GB 2447133 B 10/2009

OTHER PUBLICATIONS

Sassi et al., Sulfur Recovery from Acid Gases Using the Claus Process and High Temp. Air Comb (HiTAC) Tech., Amer. Journ. of Env. Sci., vol. 4, No. 5, pp. 502-511 (2008).

Selim et al., Acid Gas Composition Effects on the Optimum Temp. in Claus Reactor, 6th Intl. Energy Conversion Eng. Conf. (IECEC), Cleveland, OH (2008).

Elsner et al., The Claus Process: Teaching an Old Dog New Tricks, Catalysis Today, 79-80, pp. 487-494 (2003).

Ortloff, Modified Claus Process With Tail Gas Cleanup, www.ortloff.com/sulfur/claus-tailgas.htm.

El-Bishtawi et al., Claus Recycle With Double Combustion Process, Fuel Proc. Tech., 86, pp. 245-260 (2004).

Khudenko et al., Oxygen Based Claus Proc. for Recovery of Sulfur from H2S Gases, Journ. of Env. Eng., pp. 1233-1251, Nov./Dec. 1993.

Contarin et al., Energy Extraction from a Porous Media Reciprocal Flow Burner With Embedded Heat Exchangers, Journ. of Heat Transfer, vol. 127, Issue 2, pp. 123-130 (2005).

Cox et al., Economics of Thermal Dissociations of H2S to Produce Hydrogen, Int. J. Hydrogen Energy, vol. 23, No. 7, pp. 531-544 (1998).

Lagas, "Claus Process Gets Extra Boost", Hydrocarbon Process, vol. 68, Is. 4, pp. 40-42 (1989).

Sassi et al., "Sulfur Recovery fromm Acid Gas Using the Claus Process and High Temperature Air Combustion (HiTAC) Tech.", Amer. J. of Env. Sci., 4 (5): 502-511 (2008).

Paskall, "Capability of the Modified-Claus Process", A Final Rpt. to the Dept. of Energy & Nat. Res. of Prov. of Alberta (Mar. 1979).

Communication Pursuant to Article 94(3) EPC for EP 09 745 254.4, dated Nov. 5, 2012.

* cited by examiner

METHOD AND SYSTEM FOR RECOVERING SULFUR IN THE THERMAL STAGE OF A CLAUS REACTOR

PRIORITY

The present application claims priority to PCT International Application PCT/US2009/062758 filed on Oct. 30, 2009 which was published on Jun. 3, 2010 as Publication No. WO 2010/062682 A1. The PCT application claims priority from a U.S. provisional application filed on Nov. 3, 2008 titled "Efficiency Energy and Sulfur Recovery With Novel Isothermal Flame Reactor" and assigned U.S. Provisional Application Ser. No. 61/110,709; the entire contents of which are incorporated herein by reference.

PUBLISHED WORKS

The present application is directed to subject matter described in Sassi, M. and Gupta, A. K.: Sulfur Recovery from Acid Gases using the Claus Process and High Temperature Air Combustion (HiTAC) Technology, American Journal of Environmental Sciences, vol. 4, no. 5, 2008, pp. 502-511; the entire contents of which are incorporated herein by reference.

The present application is also directed to subject matter described in Selim, H., Gupta, A. K., and Sassi, M.: Acid Gas Composition Effects on the Optimum Temperature in Claus Reactor, 6$^{th}$ International Energy Conversion Engineering Conference (IECEC), Jul. 28-30, 2008, Cleveland, Ohio, published by the American Institute of Aeronautics and Astronautics, Inc.; the entire contents of which are incorporated herein by reference.

TECHNICAL FIELD

The present disclosure relates to a method and system for enhanced recovery of sulfur in a thermal stage process with simultaneous energy recovery and elimination of unwanted pollutants, such as sulfur dioxide. The controlled thermal stage causes the hydrogen sulfide to break up into sulfur dioxide which further reacts with hydrogen sulfide to form molten sulfur. The method and system result in much higher sulfur recovery in the thermal stage of the reactor than that possible in the thermal stage of currently used Claus process. The process can be used for the removal and clean conversion of any compound that decomposes in thermal environment and requires controlled thermo-chemical parameters for enhanced recovery and performance.

BACKGROUND

Sulfur-bearing compounds are very detrimental to the environment and to to industrial process equipment. They are often obtained or formed as a by-product of separation and thermal processing of fuels containing sulfur, such as coal, crude oil and natural gas. The two sulfur compounds, which need special attention, are: hydrogen sulfide ($H_2S$) and sulfur dioxide ($SO_2$). $H_2S$ is a highly corrosive gas with a foul smell.

Hydrogen sulfide is present in numerous gaseous waste streams from natural gas plants, oil refineries, wastewater treatment, among other processes. These streams usually also contain carbon dioxide, water-vapor, trace quantities of hydrocarbons, sulfur and ammonia. Waste gases with ammonia are called sour gases, while those without ammonia are called acid gases. Sulfur must be recovered from these waste streams before flaring them.

$SO_2$ is a toxic gas responsible for acid rain formation and equipment corrosion. Various methods of reducing pollutants containing sulfur are described herein below, with a focus on the Claus process. The Claus process has been known and used in the industry for over 100 years. It involves thermal oxidation of hydrogen sulfide and its reaction with sulfur dioxide to form elemental sulfur and water vapor. The Claus process is equilibrium-limited and usually achieves efficiencies in the range of 94-97%, which have been regarded as acceptable in the past years. Nowadays strict air pollution regulations regarding hydrogen sulfide and sulfur dioxide emissions call for nearly 100% efficiency, which can only be achieved with process modifications.

Sulfur recovery from sour or acid gas typically involves application of the Claus process using the reaction between hydrogen sulfide and sulfur dioxide (produced in the Claus process furnace from the combustion of $H_2S$ with air and/or oxygen) yielding elemental sulfur and water vapor:

$$2H_2S(g) + SO_2(g) \rightarrow (3/n)S_n(g) + 2H_2O(g)$$

with

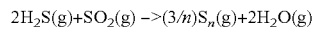

$$\Delta H_r = -108 \text{ kJ mol}^{-1}$$

Therefore, higher conversions for this exothermic, equilibrium-limited reaction call for low temperatures which lead to low reaction rates, imposing the use of a catalyst. The catalytic conversion is usually carried out in a multi-stage fixed-bed adsorptive reactors process, to counteract the severe equilibrium limitations at high conversions. This technology process can possibly provide about 96-97% conversion of the influent sulfur in $H_2S$ to S. However, higher removal requires critical examination of the process and use of near isothermal reactor since the conversion is critically dependent upon exothermic and endothermic conditions of the reactions. Flameless combustion has been shown to provide uniform thermal field in the reactor so that the reactor temperature is near uniform. In addition it has been shown to result in compact size of the reactor, reduce combustion generated pollutants emission up to 50% and increase energy efficiency up to 30%. The application of this technology appears to offer great advantages for the process under consideration.

The adoption and further development of flameless combustion technology for sulfur recovery among other commercial and industrial heating processes is expected to be very crucial and beneficial, both economically and environmentally.

The conventional sulfur recovery process is based upon the withdrawal of sulfur by in-situ condensation within the reactor. The selective removal of water should, however, be a far more effective technique as its effect on the equilibrium composition in the mass action equation is much greater. The in-situ combination of the heterogeneously catalyzed Claus reaction and an adsorptive water separation seems especially promising, as both reaction and adsorption exhibit similar kinetics and pressure can be adapted to the needs of the adsorptive separation. Such an adsorptive reactor will lead to almost complete conversion as long as the adsorption capacity is not exhausted. There are numerous possibilities for implementing these two functionalities, ranging from fixed-beds with homogeneous catalyst/adsorbent mixtures to spatially structured distributions or even fluidized beds.

For the sulfur recovery process most of the previous studies have concentrated on the Claus catalytic conversion reactors and the Tail Gas Treatment Unit (TGTU). However, some previous studies have identified the Claus furnace as one of the most important yet least understood parts of the modified Claus process. The furnace is where the combustion reaction occurs with major initial sulfur conversion (through an endothermic gaseous reaction) takes place. Any $SO_2$ remaining is converted in the downstream catalytic stages. The contaminants (such as ammonia and BTX (benzene, toluene, xylene) are supposedly destroyed. The main two reactions in the Claus furnace are:

$$H_2S + \tfrac{3}{2}O_2 \rightarrow SO_2 + H_2O \quad (1)$$

with $$\Delta H_r = -518 \text{ kJ mol}^{-1}$$

$$2H_2S + SO_2 \rightarrow \tfrac{3}{2}S_2 + 2H_2O \quad (2)$$

with $$\Delta H_r = +47 \text{ kJ mol}^{-1}$$

This last endothermic reaction is responsible for up to about 67% conversion of the sulfur at about 1200° C. Moreover, many side reactions take place in the furnace, which reduce sulfur recovery and/or produce unwanted components that end up as ambient pollutant emissions. Therefore, it would be useful to combine the endothermic and exothermic process using an isothermal reactor offered by the colorless (or flameless) oxidation combustion according to the present disclosure as described in the Detailed Description below.

A vast majority (about 92%) of the 8 million metric tons of sulfur produced in the United States in 2005 was recovered from industrial by-products using the Claus process. However, the traditional Claus process does face limitations and various process improvements have been investigated in order to satisfy the increasingly stringent emission regulations and the need to process gas streams and fuels with higher sulfur content. New technologies have to be developed in order to achieve near 100% removal of sulfur compounds from industrial flue gases.

A discussion follows regarding traditional sulfur recovery processes for understanding the Claus process.

The three main steps of sulfur recovery from sour gas are the following:

1. Amine Extraction: Gas containing $H_2S$ is passed through an absorber containing an amine solution (Monoethanolamine (MEA), Diethanolamine (DEA), Methyldiethanolamine (MDEA), Diisopropylamine (DIPA), or Diglycolamine (DGA)), where the hydrogen sulfide is absorbed along with carbon dioxide. A typical amine gas treating process includes an absorber unit and a regenerator unit as well as accessory equipment. In the absorber, the down-flowing amine solution absorbs $H_2S$ and $CO_2$ (referred to as acid gases) from the up-flowing sour gas to produce a sweetened gas stream (i.e., an $H_2S$-free gas) as a product and an amine solution rich in the absorbed acid gases. The resultant "rich" amine is then routed into the regenerator (a stripper with a re-boiler) to produce regenerated or lean amine that is recycled for reuse in the absorber. The stripped overhead gas from the regenerator is concentrated $H_2S$ and $CO_2$. The extracted mixture of $H_2S$ and $CO_2$, referred to as an acid gas, is passed into the Claus unit for sulfur recovery. The process is also known as Gas sweetening and Acid gas removal. Amines are also used in many oil refineries to remove acid gases from liquid hydrocarbons such as Liquefied Petroleum Gas (LPG).

2. Claus Thermal Stage: $H_2S$ is partially oxidized with air (one-third of $H_2S$ is converted into $SO_2$) in the Claus furnace. The acid gas/air mixture is passed into a furnace operating at temperatures from 1300-1700 K, where the reactions are allowed sufficient time to reach equilibrium. The products from this step are: sulfur dioxide, water and unreacted hydrogen sulfide. Additionally some of the sulfur dioxide produced here reacts with hydrogen sulfide inside the furnace to produce sulfur according to reactions (1) and (2) shown above. The furnace products flow then into a waste heat boiler to condense the sulfur and produce high pressure steam for the Claus catalytic stages (see FIG. 6).

Depending on the calorific value of the acid gas, various methods of stable burning are achieved. If very lean acid gases are involved (low calorific value) then auxiliary fuel, oxygen enrichment or a by-pass stream has to be used. The $H_2S$-content and the concentration of other combustible components (hydrocarbons or ammonia) determine the location where the feed gas is burned. Claus gases (acid gas) with no further combustible contents apart from $H_2S$ are burned in lances surrounding a central muffle. Gases containing ammonia, such as the gas from the refinery's Sour Water Stripper (SWS) or hydrocarbons are converted in the burner muffle.

3. Claus Catalytic Stage: The remaining $H_2S$, from the Claus furnace, is reacted with the $SO_2$ at lower temperatures (about 470-620 K) over an alumina- or titanium dioxide-based catalyst to make more sulfur:

$$2H_2S + SO_2 \rightarrow \tfrac{3}{8}S_8 + 2H_2O \quad (3)$$

$$\Delta H_r = -108 \text{ kJ mol}^{-1}$$

On average, about 70% of $H_2S$ and $SO_2$ will react via reaction (3). Note that in the catalytic stage mostly $S_8$ is produced, which is an exothermic reaction whereas in the thermal stage $S_2$ is the major product and the reaction is endothermic. Other allotropes of sulfur may also be present in smaller quantities.

The overall reaction for the entire process is:

$$3H_2S + 1.5O_2 \rightarrow 3/n S_n + 3H_2O \quad (4)$$

$$\Delta H_r = -6268 \text{ kJ mol}^{-1}$$

Reactions (1) and (3) are exothermic and a cooling stage is needed following these steps in order to condense the sulfur produced. The condensed phase is then separated from the gas stream by draining it into a container. An interesting property of liquid sulfur is its increase in viscosity with temperature. This is due to polymerization of sulfur at around 430 K. Therefore, the temperature of condensed sulfur should be closely monitored to prevent polymerization and clogging of pipes used in the process. Care must also be taken in order not to pass condensed sulfur through the catalyst, which would become fouled and inefficient. Liquid sulfur adsorbs to the pores and deactivates the catalytic surface. Therefore, reheat stages using the previously generated steam are needed in order to keep the sulfur in gas phase while in the catalytic stage. Several methods of reheating used in industry are:

1. Hot-Gas Bypass: involves mixing the two process gas streams from the process gas cooler (cold gas) and the bypass (hot gas) from the first pass of the waste heat boiler.

2. Indirect Steam Reheaters: the gas can also be heated with high pressure steam in a heat exchanger.

3. Gas/Gas Exchangers: whereby the cooled gas from the process gas cooler is indirectly heated from the hot gas coming out of an upstream catalytic reactor in a gas-to-gas exchanger.

4. Direct-fired Heaters: fired reheaters utilizing acid gas or fuel gas, which is burned sub-stoichiometrically to avoid oxygen breakthrough and damage to Claus catalyst.

A typical Claus process involves one thermal stage followed by multiple catalytic stages in series to maximize efficiency. The need for multiple catalytic stages increases complexity and cost. Therefore, various methods of minimizing these steps in the process have been proposed.

A schematic of the process flow diagram along with approximate gas temperatures is shown in FIG. 1. The flow diagram includes a burner 10, furnace 12, boiler 14, condensers 16a, 16b, re-heater 18, and catalytic stage 20. During operation, high-pressure steam (40 atm) is generated in the boiler 14 and low-pressure steam (3-4 atm) is produced in the condensers 16a and 16b. A total of two to four catalytic stages 20 are typically used in order to maximize efficiency. The tail gas 22 is either routed to a clean-up unit or to a thermal oxidizer to incinerate the remaining sulfur compounds into $SO_2$. Where an incineration or tail-gas treatment unit (TGTU) is added downstream of the Claus plant, only two catalytic stages are usually installed. Before storage and downstream processing, liquid sulfur streams from the process gas cooler, the sulfur condensers and from the final sulfur separator are routed to the degassing unit, where the gases (primarily $H_2S$) dissolved in the sulfur are removed. Over 2.6 tons of steam will be generated for each ton of sulfur yield.

The Claus process is equilibrium-limited. In the furnace stage the $SO_2$ produced from the combustion process (reaction 1) recombines with $H_2S$ in an endothermic reaction to form $S_2$ (reaction 2). Adequate residence time has to be provided in order to allow this reaction, responsible for 60-74% of sulfur conversion, to reach equilibrium. Since the main Claus reaction 3 is exothermic, this stage calls for the use of low temperatures in order to shift the equilibrium constant towards higher product yields. The low temperatures, however, lead to decreased reaction rates, hence the need for a catalyst. The law of mass action for the Claus reaction is as follows:

$$K_P(T) = \frac{p_{H_2O}^2 p_{S_8}^{3/8}}{p_{H_2S}^2 p_{SO_2}} \quad (5)$$

Where, $K_P(T)$ is the chemical equilibrium constant and $P_{H2O}$, $P_{S8}$ are partial pressures of the products and $P_{H2S}$, $P_{SO2}$ and partial pressures of the reactants.

This equation illustrates the nature of equilibrium limitations involved in the Claus process; decreasing the process temperature can increase the equilibrium constant and thus increase conversion, but the lower limit of this temperature and hence the upper is limit of equilibrium conversion is set by the condensation temperature of sulfur. A typical arrangement for the Claus sulfur recovery process is shown in FIG. 2.

Improvements on Claus Process: The traditional Claus process has been a reliable and relatively efficient way of removing hydrogen sulfide from the flue gas and converting it into elemental sulfur. It has, however, faced some shortcomings and limitations. Increasingly stringent air pollution regulations from oil, gas and chemical processing facilities combined with the fact that lower-grade, higher sulfur-content fuels will have to be used in the near future, call for improved efficiency of the process.

Eisner, et al. (M. P. Elsner, M. Menge, C. and Müller, D. W. Agar "The Claus Process: Teaching an Old Dog New Tricks" Catalysis Today 79-80 (2003) pp. 487-494) proposed an adsorptive water separation process applied in the catalytic reactor stage. Taking advantage of Le Chatelier's principle, this process removes $H_2O$ (one of the products) from the reaction, shifting equilibrium towards higher conversion (Equation (5)). An adsorptive reactor of this type could produce complete conversion in a single catalytic stage.

The Zeolite adsorbent beads saturate with water after a certain time and therefore need to be regenerated. This calls for a cyclic process where the flow of gas is reversed and hot gas is used to vaporize the adsorbed water off of the surface of Zeolite spheres and remove them from the reactor. The process can then be reversed again to regenerate the second adsorptive reactor (FIG. 3).

FIG. 3 shows that 100% conversion can be achieved in the reactor for a longer time than in a conventional Claus reactor with no water adsorption. The decline in conversion efficiency after a period of about 1.3 hrs is due to the fact that the Zeolite spheres are saturated with steam and they need to be regenerated. It was also found that as a side effect of the water adsorption, the chemisorption of $SO_2$ on the surface of the alumina catalyst occurs.

A Cold Bed Adsorption (CBA) process, also known as the sub-dew point process developed by the Amoco Corporation has been shown to produce efficiencies in the range of 97.5-99.5%. In the CBA process the heterogeneous catalytic reaction is allowed to take place at low temperatures (below sulfur dew point), thus increasing equilibrium conversion. Additionally since the Claus reaction occurs in the gas phase, this liquid sulfur does not inhibit the reaction like sulfur vapor does, effectively removing one of the reaction products to result in a favorable shift in the reaction equilibrium and higher sulfur conversion. The condensed phase is then periodically desorbed from the catalytic surface by flowing hot gas through the unit to vaporize the condensate, thus regenerating the reactor. Therefore, this process is inherently a cyclic one.

There are normally two or more CBA reactors in series so that at least one can be operating sub-dew point while the other is being regenerated. Due to the cyclic nature of the CBA process, the CBA switching valves are subjected to very demanding sulfur vapor service that has caused significant operation and maintenance problems in many of the CBA plants.

Sulfur recoveries in excess of 99.5% have been achieved with the Modified Claus process with tail gas cleanup developed by Ortloff ("Modified Claus Process With Tail Gas Cleanup" http://www.ortloff.com/sulfur/claus-tailgas.htm). In this process the sulfur-bearing compounds (COS, $CS_2$, $SO_2$, $SO_2$, $S_n$) in the tail gas are converted to $H_2S$ using hydrolysis and hydrogenation and recycled back into the Claus unit. Amine-based tail-gas cleanup is also used to recover the remaining hydrogen sulfide in the tail gas.

The Modified Claus Process with Tail Gas Cleanup Unit (TGCU) is used when very high sulfur recovery is necessary, such as for sulfur plants in petroleum refineries in the U.S. The U.S. EPA regulations normally require that the incinerated effluent from refinery sulfur plants contain no more than 250 ppmv $SO_2$ on a dry, oxygen-free basis. This usually corresponds to an overall sulfur recovery of 99.8-99.9%. The problem with any TGCU is that it usually costs as much as the whole Claus plant while it adds only about 2% in the total sulfur recovery. Lagas, et al. (J. A. Lagas, J. Borsboom, and G. Heijkoop "Claus Process Gets Extra Boost" Hydrocarbon Processing, April 1989: pp. 40-42) describe a selective oxidation process, in which the tail gas is selectively oxidized in the presence of active metal oxides to produce sulfur and small quantities of $SO_2$. Total sulfur recovery of 99% has been achieved this way (99.4% with an additional hydrogenation step).

Oxygen enrichment technologies have been proposed to increase sulfur recovery, throughput of the system and decrease the size of the unit by reducing the amount of inert nitrogen from the process. The resultant high flame temperatures have to be dealt with using techniques such as staged combustion and water spraying because of material limitations. The increased complexity of the system is offset by the fact that better mixing, higher reaction rates, conversion and throughput for a given size of the unit are achieved.

FIG. 4 suggests that it is desirable to remove water from the reaction furnace during the process. As water is one of the products of the reaction, its removal will lead to the shift in equilibrium towards the product side and hence more conversion is achieved.

The removal of nitrogen and introduction of oxygen into the process has many effects. First, removal of the diluent nitrogen results in the increased partial pressure of each of the reacting species; second, the reduced volume of reacting gases is easier to mix; and, third, higher temperatures can be obtained. All three resulting in increases in the process rate (FIG. 5).

The use of a gas recycling process has been proposed by the CNG group. The effluent gas from the first condenser was recycled back into the burner to attain overall sulfur recovery of 100%. However, intermediate stages had to be used to remove water vapor and nitrogen from the recycled gas to achieve efficient conversion and stable flame regime. A separator membrane can typically be used to separate nitrogen out of the stream. However, if pure oxygen is used in the combustion process, the membrane is not necessary and only water condensation is needed before the tail gas can be recycled back into the unit.

The heat recovery for this process is increased, since the water condensation heat can also be extracted out of the stream. In a recent work, El-Bishtawi, et al. (R. El-Bishtawi, and N. Haimour "Claus Recycle with Double Combustion Process" Fuel Processing Technology 86, pp. 245-260, 2004) describes a Claus recycle with double combustion process. The acid gas was partially combusted in the first furnace and the hot exhaust was passed into the second furnace where the remainder of oxygen was added to complete the reaction. The second furnace operated at a high temperature air combustion regime, since the inlet gas was above its auto-ignition temperature.

One sulfur condenser was used following the two furnaces. Part of the effluent gas was recycled back into the first furnace. It was reported that 100% conversion could be achieved without the use of catalytic reactors and with only one condenser. Such an arrangement should reduce the cost and complexity of the system by removing the catalytic stages. It was also found that the oxygen content should not exceed 78% in order not to exceed the maximum temperature limitations of the equipment materials.

SUMMARY

The present disclosure provides a method and system for recovering sulfur in a thermal stage process. In particular, the present disclosure relates to a method and system for enhanced recovery of sulfur in a thermal stage process with simultaneous energy recovery and elimination of unwanted pollutants, such as sulfur dioxide. The controlled thermal stage causes the hydrogen sulfide to break up into sulfur dioxide which further reacts with hydrogen sulfide to form molten sulfur. The method and system result in much higher sulfur recovery in the thermal stage of the reactor than that possible in the thermal stage of currently used Claus process. The process can be used for the removal and clean conversion of any compound that decomposes in thermal environment and requires controlled thermo-chemical parameters for enhanced recovery and performance.

The improved Claus process according to the present disclosure involves using high temperature air combustion technology (HiTAC) or otherwise called colorless (or flameless) combustion for application in Claus furnaces, especially those employing lean acid gas streams that contain large amounts of inert gas streams (such as nitrogen and $CO_2$) and which cannot be burned without the use of auxiliary fuel or oxygen enrichment under standard conditions. With the use of HiTAC, diluted $H_2S$ gas streams (less than 15% $H_2S$), Low Calorific Value (LCV) fuels can be burned with very uniform thermal fields without the need for fuel enrichment or oxygen addition. The uniform temperature distribution favors clean and efficient burning with an additional advantage of significant reduction of $NO_x$, CO and hydrocarbon emission.

The present disclosure further describes many different embodiments for a Claus reactor configured and designed for performing the improved Claus process according to the present disclosure.

These and other advantages and inventive concepts are described herein with reference to the drawings and the detailed description which follows.

DETAILED DESCRIPTION

Figure 1:
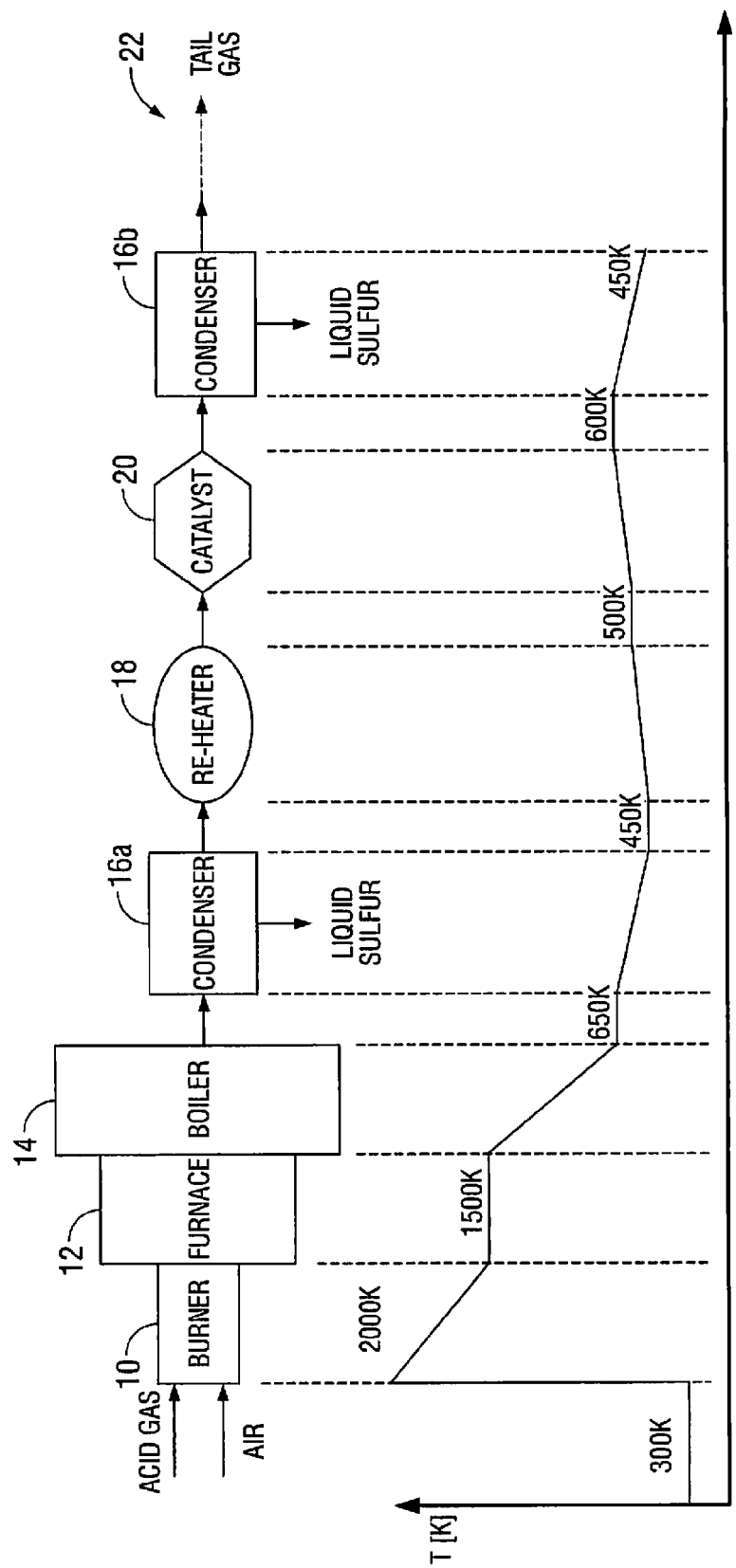
FIG. 1 illustrates a flow diagram of a prior art Claus process.
Figure 2:
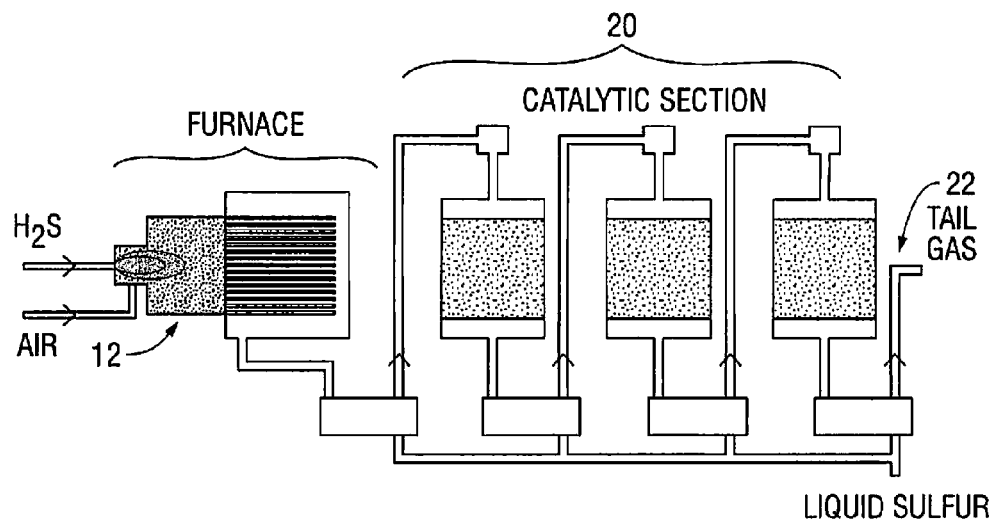
FIG. 2 illustrates a prior art arrangement of a Claus unit.
Figure 3:
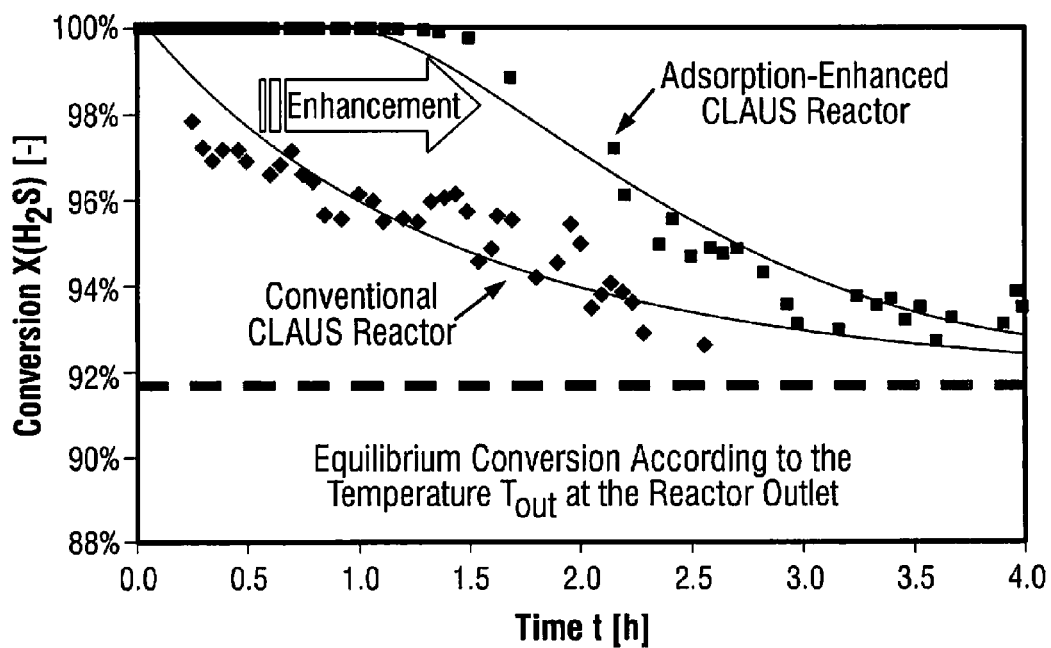
FIG. 3 illustrates a graph of hydrogen sulfide conversion as a function of time.
Figure 4:
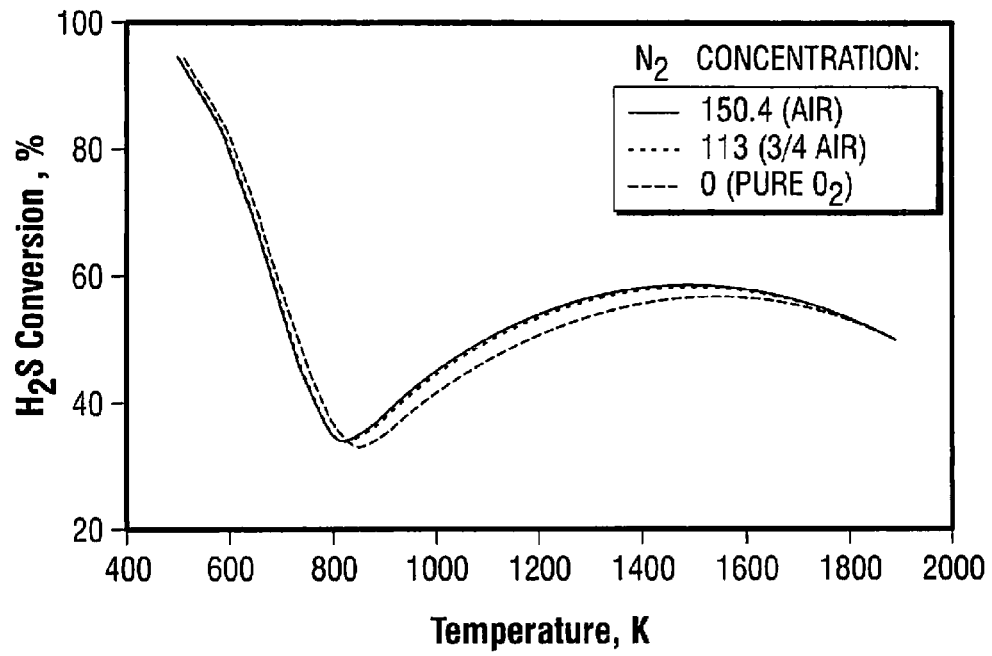
FIG. 4 illustrates a graph of calculated hydrogen sulfide conversion as a function of reactor temperature for different oxygen concentrations.
Figure 5:
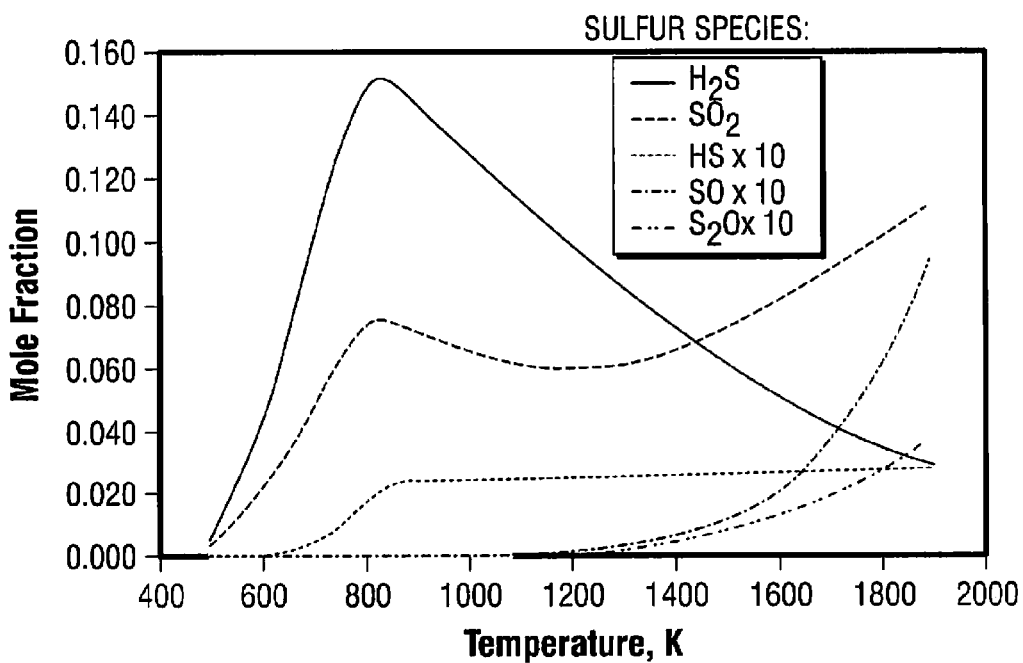
FIG. 5 illustrates a graph of calculated concentrations of sulfur species as a function of temperature.

Improvements on the Claus process in accordance with the present disclosure will now be described. In particular, a description is provided in Section I below directed to the use of HiTAC technology as a reliable and cost-effective alternative for improvement of concentrated or diluted acid gas treatment in the Claus process according to the present disclosure. The colorless or flameless (super-adiabatic) combustion according to the present disclosure is also described for processing acid-rich gas. Conclusions are presented in Section II.

I. Claus Process with HiTAC

In the case of diluted acid gas feeds (<15% $H_2S$) (or concentrated $H_2S$ gas streams) special considerations have to be taken in order to maintain a stable flame in the burner and achieve good combustion efficiency. Common approaches include: oxygen enrichment, a split-flow process and use of auxiliary fuel. In the case of oxygen enrichment the flame temperature is increased by removing part or all of inert nitrogen from air, thus decreasing the thermal loading of the system. In the split-flow process part of the acid gas is allowed to bypass the burner, which leaves adequate fuel/air proportions in the burner and higher flame temperature. The by-pass flow is then reintroduced into the furnace at a later stage in order to keep the $H_2S:SO_2$ ratio 2:1 (Eq. 2 and 3) to maintain an overall equivalence ratio of 3. Change in the distribution of equivalence ratio in the combustion chamber can significantly reduce the efficiency. For example, at an equivalence ratio of 2, the sulfur capture efficiency is reduced to about 55%. With the use of auxiliary fuel the calorific value of the gas is increased. Stable flame of a higher temperature is therefore possible.

Paskall (Paskall H. G., 1979, Capability of the modified Claus process. Western Research, Alberta, Canada) collected a substantial amount of field data and reviewed the literature data on sulfur conversion in Claus furnaces and recommended that sulfur conversions are greater in furnaces that are designed for greater gas mixing and turbulence and equipped with burners that provide for good mixing of the feed gas and oxidizer and in furnaces of smaller volume. HiTAC or flameless or colorless combustion furnaces can achieve all of these recommendations and beyond, providing the highest sulfur recovery. Furthermore, Khudenko et al. (B. M. Khudenko, G. M. Gitman, and T. E. P. Wechsler "Oxygen Based Claus Process for Recovery of Sulfur from $H_2S$ Gases" Journal of Environmental Engineering, November/December 1993, pp. 1233-1251) through several thermodynamic and process simulation scenarios showed that a dual thermal stage system with cold products recycle (very similar to flameless concept) provides the greatest capacity reserve. They claimed that, with the dual stage system, no changes in the existing process train are required, even when the throughput capacity of the existing conventional system is more than doubled.

Economically this is very wise and attractive for increasing sour gas production in the oil and gas industry due to the exploitation of aging reservoirs. A reciprocal flow filtration combustor with embedded heat exchangers for super-adiabatic combustion has been proposed and studied by the Gas Technology Institute (GTI) and the University of Illinois at Chicago (Fabiano Contarin, William M. Barcellos, Alexi V. Saveliev, and A. Lawrence Kennedy, "Energy Extraction from a Porous Media Reciprocal Flow Burner With Embedded Heat Exchangers", Journal of Heat Transfer, February 2005, Volume 127, Issue 2, pp. 123-130). The motion of the flame zone to the downstream of the reactant gas mixture results in positive enthalpy flux to the cold gas and thus increasing the reactant temperature prior to combustion. This is similar to the principles of HiTAC.

A prototype was build and tested for sulfur recovery at GTI. The results showed that the super-adiabatic combustion (which is very similar to flameless or colorless combustion in principle, but taking place in a non-catalytic porous medium) significantly extends conventional flammability limits to the region of the ultra-low heat content mixtures (such as lean acid gas) and features ultra low emissions for $NO_x$ and CO.

Therefore, High Temperature Air Combustion (HiTAC) technology according to the present disclosure is an alternative treatment of lean to very diluted (<15% $H_2S$) Low Calorific Value (LCV) acid gases at very high sulfur recovery (about 74% in the thermal stage). This will reduce the number of expensive catalytic stages. While a stable conventional flame is usually not achievable in this regime, HiTAC provides very lean homogeneous thermal field uniformity flames. Moreover, uniform thermal characteristics with high and uniform heat flux distribution in the combustion chamber are achievable for high yield of sulfur with no release of sulfur dioxide to the environment. This results in high overall yield of sulfur (about 74% in the thermal stage) during the thermal stage conversion, low emissions of sulfur dioxide gas and other pollutants (such as oxides of nitrogen, carbon monoxide and black carbon) from the thermal process.

The process also reduces mechanical stresses associated with the more conventional high temperature combustion process that results in high temperature fluctuations and hot spot zones with maximum and minimum temperatures. Uniform thermal field in the process is especially useful to reduce NOx emissions by avoiding the "hot spots" zones in the flames that are responsible for thermal NOx formation and cause excessive noise. With the improved process the need for by-pass feed stream, oxygen enrichment and multiple furnaces can be eliminated as the lean acid gas could be oxidized in a single furnace operating above the auto-ignition temperature of the mixture, with good conversion efficiency.

In fact, it has been reported that HiTAC technology has shown significant reduction in pollutants emissions (about 50%), reduction in the size of the combustion chamber (about 25%), reduced thermal losses to the environment and significant energy savings (about 30%). High temperature air combustion is especially useful for reducing $NO_x$ emissions due to its uniform thermal field and overall lower operating temperature and no adiabatic flame with hot spots that are responsible for thermal $NO_x$ formation. With the use of HiTAC the need for by-pass feed stream, oxygen enrichment and multiple furnaces could be eliminated as the lean acid gas could be oxidized in a single furnace operating above the auto-ignition temperature, with good conversion.

Figure 6:
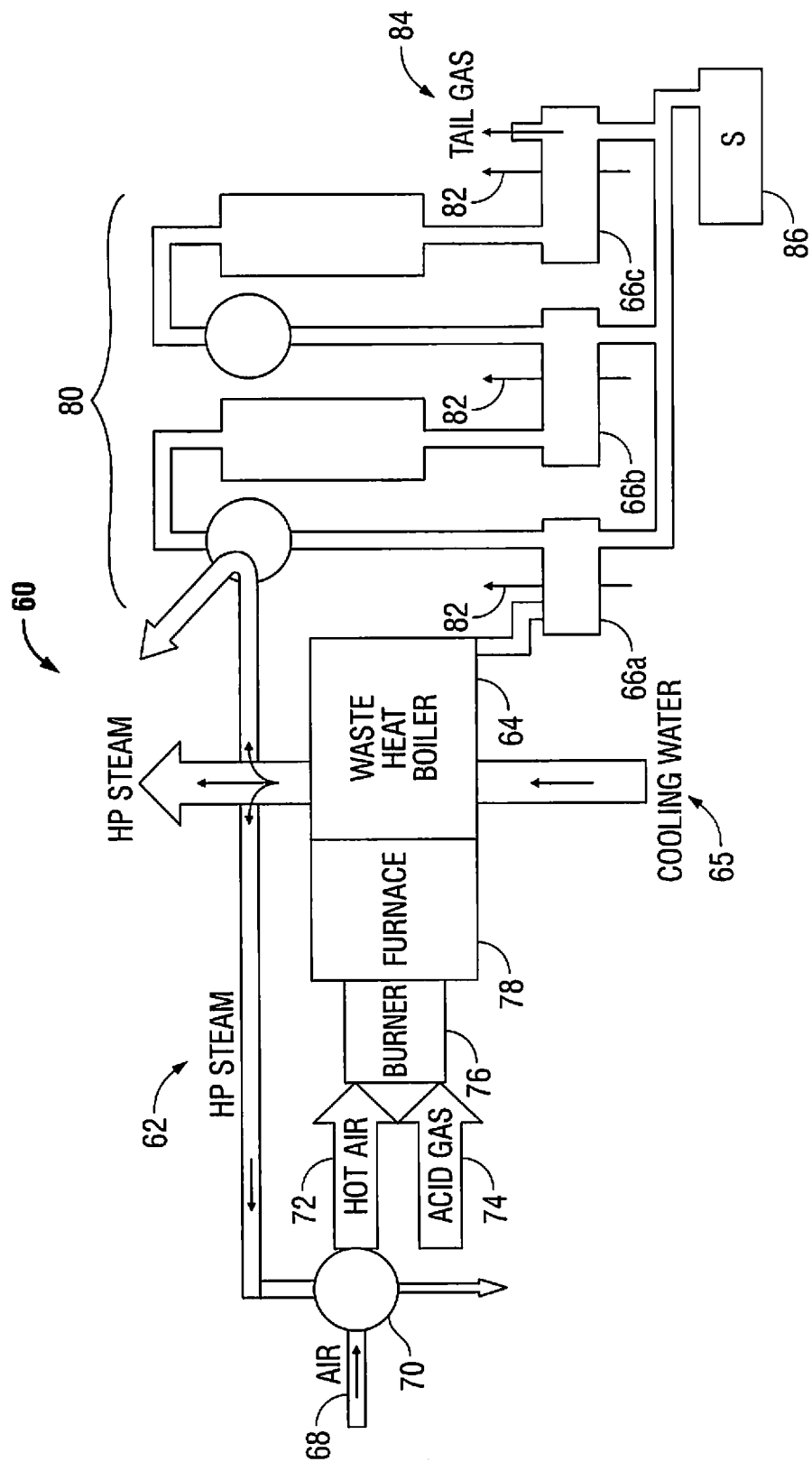
FIG. 6 illustrates a diagram of a Claus system with high temperature air combustion according to the present disclosure.

As far as practical considerations are concerned, the Claus process is well suited for the use of HiTAC technology. A novel flameless Claus reactor using HiTAC technology in accordance with the present disclosure is shown by FIG. 6 and designated generally by reference numeral 60. As high pressure (HP) steam 62 is generated in a waste heat boiler 64 as well as in the condensers 66a, 66b, 66c, it is readily available to preheat the incoming air stream 68 in a heat exchanger 70. The incoming air stream 68 is heated in the heat exchanger 70 by the incoming high pressure steam 62 to generate hot air 72. The hot air 72 is introduced, along with the acid gas 74, to an efficient burner 76. The burner 76 provides for good mixing of the feed gas 74 and oxidizer (hot air) 72. Water 65 is used to cool the waste heat boiler 64.

The byproducts of the burner 76 are then directed to a furnace 78 where the colorless (or flameless) oxidation combustion reaction and the initial sulfur conversion (through an endothermic gaseous reaction) take place and also where the $SO_2$ required by the downstream catalytic stages 80 is produced. The catalytic stages 80 produce low pressure steam 82 and tail gas 84, as well as provide for the recovery of sulfur 86. This Claus reactor is characterized as a flameless thermal Claus reactor since this controlled HiTAC condition provides an invisible flame in the thermal reactor.

Figure 7:
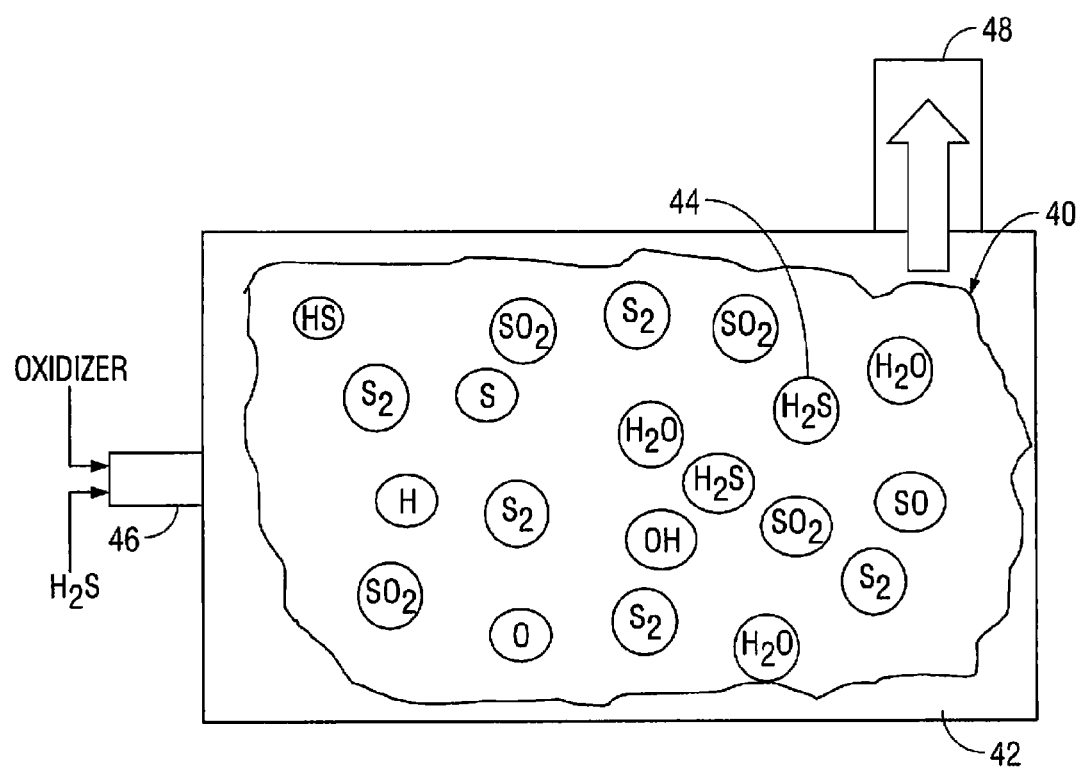
FIG. 7 illustrates a flameless Claus reactor having a flame zone that covers almost the entire area of the combustion chamber.

As shown by the illustration of FIG. 7, the flameless Claus reactor 60 has a flame zone 40 that covers almost the entire area of the combustion chamber 42. As a result, approximately all the sulfur-containing compounds 44 (i.e., $H_2S$) entering the combustion chamber 42 via input port 46 are incinerated, thereby having a greater elemental sulfur and sulfur dioxide recovery yield than prior art Claus reactors. These substances exit or exhaust from the combustion chamber 42 via an exhaust/heat exchanger unit 48. Unit 48 eliminates unwanted gases and also preheats the oxidizer before it is routed to input port 46.

Figure 8:
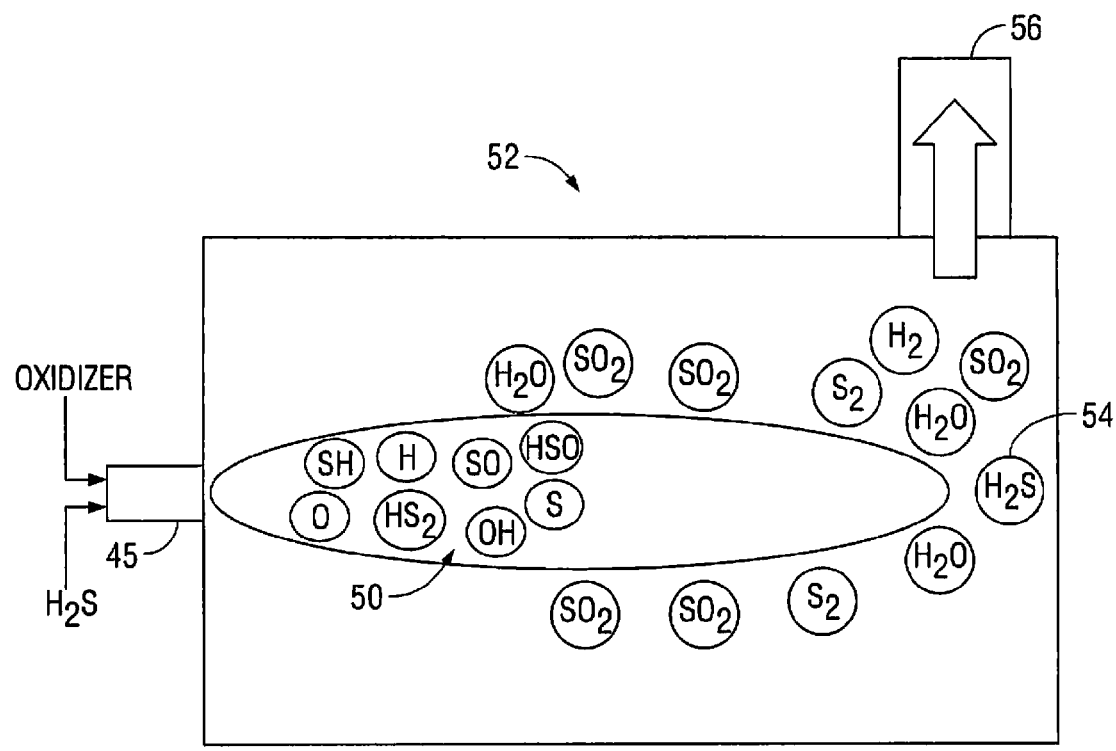
FIG. 8 illustrates a prior art Claus reactor having a flame zone that covers only a reduced area of the combustion chamber.

In contrast, in a prior art non-flameless Claus reactor (see FIG. 8), the flame zone 50 covers only a reduced area of the combustion chamber 52. As a result, not all of the sulfur-containing compounds 54 (i.e., $H_2S$) which entered the reactor via input port 45 are incinerated. This is depicted by the $H_2S$ sulfur-containing compound 54 being outside the flame zone 50 in FIG. 8. This sulfur-containing compound 54 exits the reactor through an exhaust pipe 56.

In High Temperature Air Combustion, the air is brought to above the auto-ignition temperature of the fuel to obtain uniform ignition and combustion characteristics across the reactor. The reported auto-ignition temperature of hydrogen sulfide (563 K or 290° C.) is lower than a typical auto-ignition temperature for hydrocarbon fuels (400-600° C.) and therefore requires less energy extraction from the high-pressure steam to achieve ignition and sustained combustion. During the transient start-up period, preheating with an electrical heater or auxiliary fuel can be used after which self-sustained operation at steady-state conditions can be maintained. Issues of air/fuel mixing, flame characteristics, such as temperature, size and flammability limits, that are relevant for the Claus process, must first be investigated. The resultant uniform thermal field in the flameless combustor plus gas recycling is expected to produce close to 100% conversion.

For rich acid gas oxidation, flammability limits and flame stability are not an issue due to the high calorific value of the gas. However, thermal field uniformity offered by flameless or colorless combustion would always promote better conversion and lower pollutant emissions, among other benefits as mentioned above. Furthermore the super-adiabatic flame studies, discussed earlier, featured that fuel rich (much more than stoichiometric $H_2S$ to oxygen ratio) conditions promote $H_2S$ conversion to $H_2$ and $S_2$ rather than $H_2O$ and $SO_2$. Their numerical results showed that at a super-adiabatic temperature of about 1650K and an equivalence ratio of about 10, an overall $H_2S$ conversion of 50% resulted with an $H_2/H_2O$ selectivity of 57/43 and an $S_2/SO_2$ selectivity of 99/1. These conditions, with even higher temperature, would be easily attained under flameless combustion with $H_2S$ recycling and pre-heating. This flameless combustion assisted-thermal decomposition of $H_2S$ would then eliminate any catalytic stage use and produce hydrogen which is highly needed in fuel processing and power production.

The thermal decomposition of $H_2S$ is a well researched route for the production of hydrogen and Cox et al. (Cox B. G., Clarke P. F. and Pruden B. B., 1998, Economics of thermal dissociations of $H_2S$ to produce hydrogen, Int. J. Hydrogen Energy, Vol. 23, No. 7, pp. 531-544) presented a study on the economics of thermal dissociation of $H_2S$ to produce hydrogen and some studies are even at the pilot plant stage. However, none of the early studies address the problem of heat transfer. Due to the endothermic heat of reaction, heat transfer limits the overall rate of reaction resulting in low conversions. However, with flameless or colorless combustion the $H_2S$ rich mixture reacts in a very hot homogeneous medium with no heat transfer limitations and therefore will present much higher conversions.

A description will now be provided with reference to FIGS. 9 and 11-23 which illustrate different embodiments or configurations of a flameless Claus reactor using HiTAC technology in accordance with the present disclosure. It is contemplated that these embodiments can be used for other chemical reactions besides performing the chemical reactions (1) and (2) associated with a Claus reactor. In each embodiment, the exhaust port also includes a heat exchanger for pre-heating the oxidizer before it is routed to one or more input ports.

Figure 9:
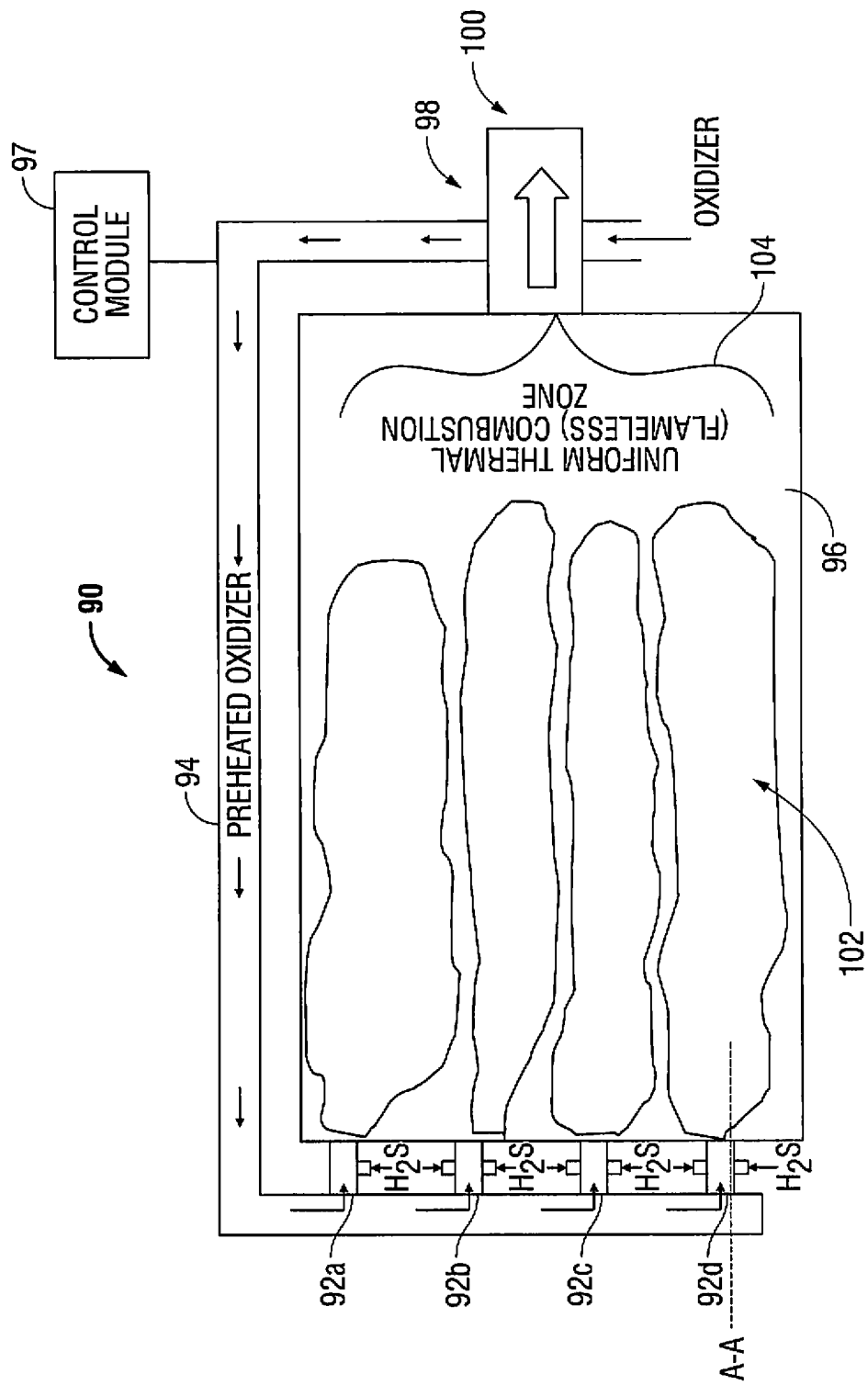
FIG. 9 illustrates an embodiment or configuration of a Claus reactor using HiTAC technology in accordance with the present disclosure.

FIG. 9 illustrates an embodiment of a Claus reactor 90 having four input ports 92*a*-*d* for introducing a mixture of hydrogen sulfide and a preheated oxidizer 94 within a combustion chamber 96 of the reactor 90. The oxidizer is heated by directing it in close proximity to a heat exchanger 98 which absorbs heat exiting from the exhaust 100. The preheated oxidizer 94 and the hydrogen sulfide gas chemically react forming an $H_2S$/oxidizer flamelet 102 for each input port 92. The flamelets 102 incinerate the hydrogen sulfide gas within a uniform thermal (flameless) combustion zone 104.

The Claus reactor 90 enables the combustion of hydrogen sulfide while simultaneously recovering sulfur and thermal energy at higher efficiency than prior art Claus reactors.

FIGS. 10*a*-10*c* illustrate three different geometries for an interior 106 of the input ports 92*a*-*d* of the Claus reactor 90 taken along line shown by FIG. 9. The geometry of the input port 92 determines the direction(s) of the internal flow pattern 106 as shown by FIGS. 10*a*-10*c*. Other factors that can be used to affect the direction(s) of the internal flow pattern is the location of an input port(s) for introducing an oxidizer fluid with respect to the location of an input port(s) for introducing hydrogen sulfide (see, e.g., FIGS. 11-18); velocity of the fluids introduced into the combustion chamber 96; the combustibility of the fluids; temperature within the combustion chamber 96; premixing the hydrogen sulfide with other fluids, such as nitrogen and/or carbon dioxide; and by controlling the amount of oxidizer introduced into the combustion chamber 96 via an air introduction system.

The reactor 90 and the other novel reactors described herein with respect to FIGS. 6, 7 and 11-23 include one or more control modules 97 for controlling one or more of these factors which in turn controls the internal flow pattern, mixing and thermal field uniformity, and hence the amount of sulfur recovered and the amount of thermal energy. For example, it is desired for the temperature within the combustion chamber 96 to be less than 25K for optimum sulfur recovery.

FIG. 10*a* illustrates the input port 92 having two side ports 110*a* and 110*b* for directing hydrogen sulfide gas to the combustion chamber 96, and one, unobstructed main port 110*c* for directing a preheated oxidizer to the combustion chamber 96 for mixing with and reacting with the hydrogen sulfide gas. The hydrogen sulfide gas and the preheated oxidizer are injected perpendicular to each other forming an internal flow pattern 106 in one direction.

Figure 10:
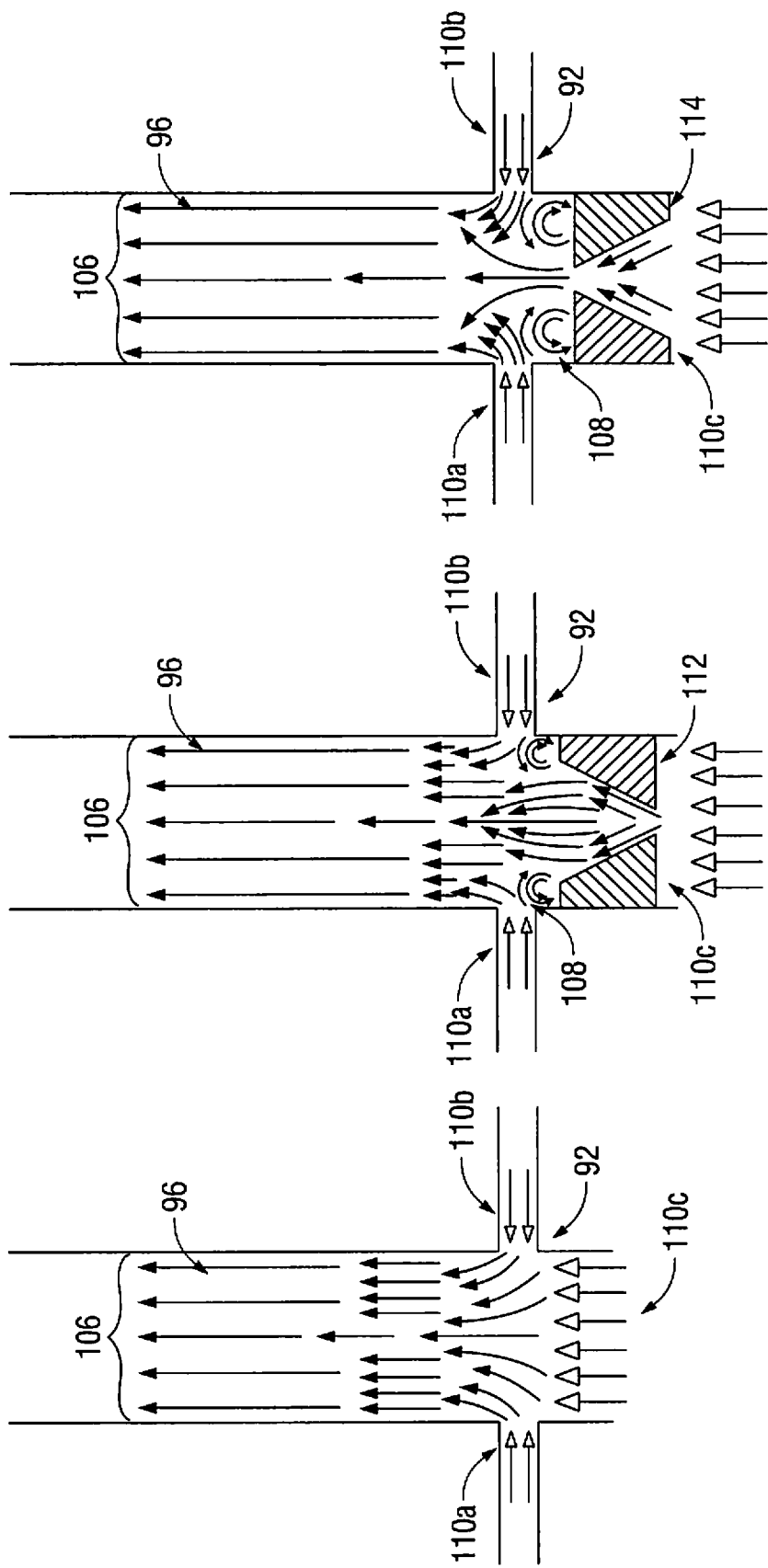
FIGS. 10a-10c illustrate three different geometries for an interior of an input port of the Claus reactor taken along line A-A shown by FIG. 9.

The internal flow pattern 106 in the configurations shown by FIGS. 10-10*c*, as well as FIGS. 11-18, operates as an induced jet pump which causes significant recirculation of the oxidizer prior to chemical reaction of the reactants. This recirculation of the reactants maximizes the amount of sulfur recovered. The internal flow pattern can include swirl motion 108 (FIGS. 10*b* and 10*c*) by obstructing the main port 100*c* with a divergent conical body 112 (FIG. 10*b*) or a convergent conical body 114 (FIG. 10*c*). The swirl motion 108 produces desired thermal characteristics within the reactor 90, such as a uniform and defined thermal set point, and an increase in the amount of thermal energy generated. The internal flow pattern can also include other types of motion, including spiral motion as shown by FIGS. 11-18.

Figure 11:
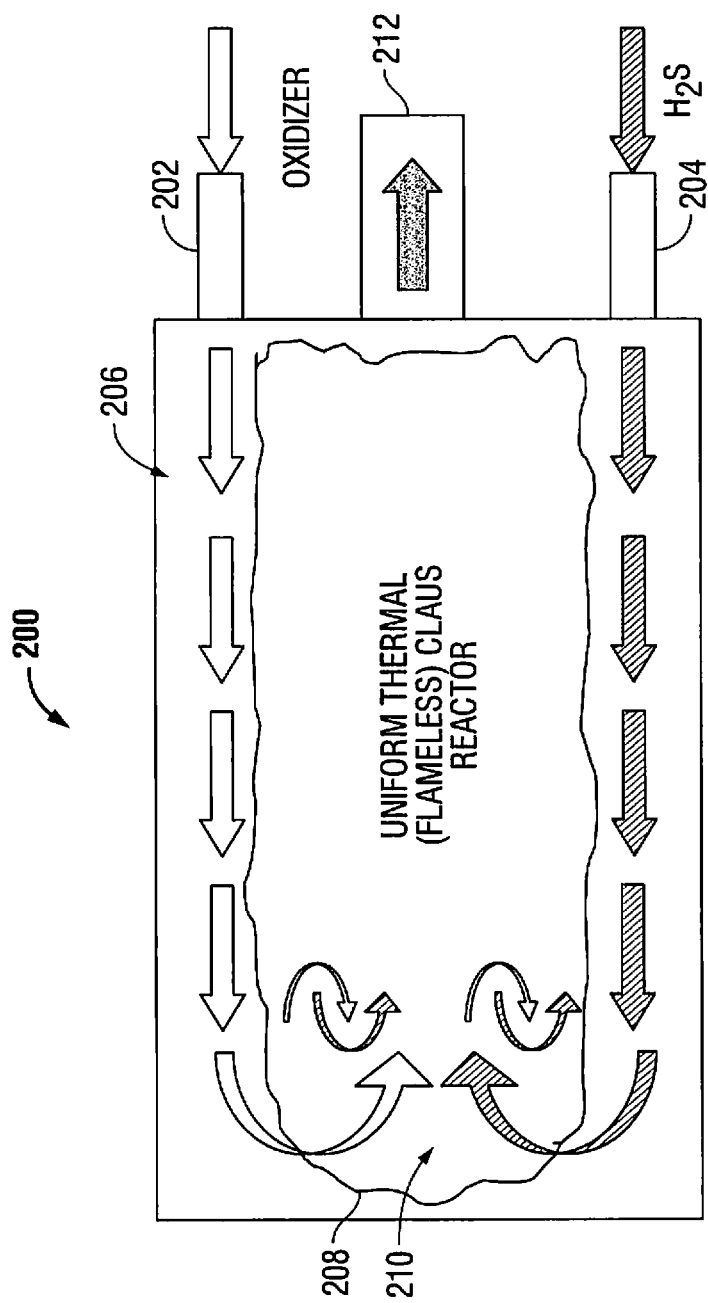
FIGS. 11-23 illustrate additional embodiments or configurations of a Claus reactor using HiTAC technology in accordance with the present disclosure.

FIG. 11 illustrates an embodiment of a Claus reactor 200 having two separate input ports 202, 204 on the same side of the reactor 200. One input port 202 is used for introducing an oxidizer into a combustion chamber 206. The other input port 204 is used for introducing hydrogen sulfide into the Claus reactor 200. The two reactant fluids intermix at an opposite end 208 of the reactor 200 forming a uniform thermal distribution flow pattern 210. The pattern 210 is formed in a central area of the combustion chamber 206 as shown by FIG. 11. An output port 212 is provided for the exhaust fluids to exit or exhaust from the combustion chamber 206.

Figure 12:
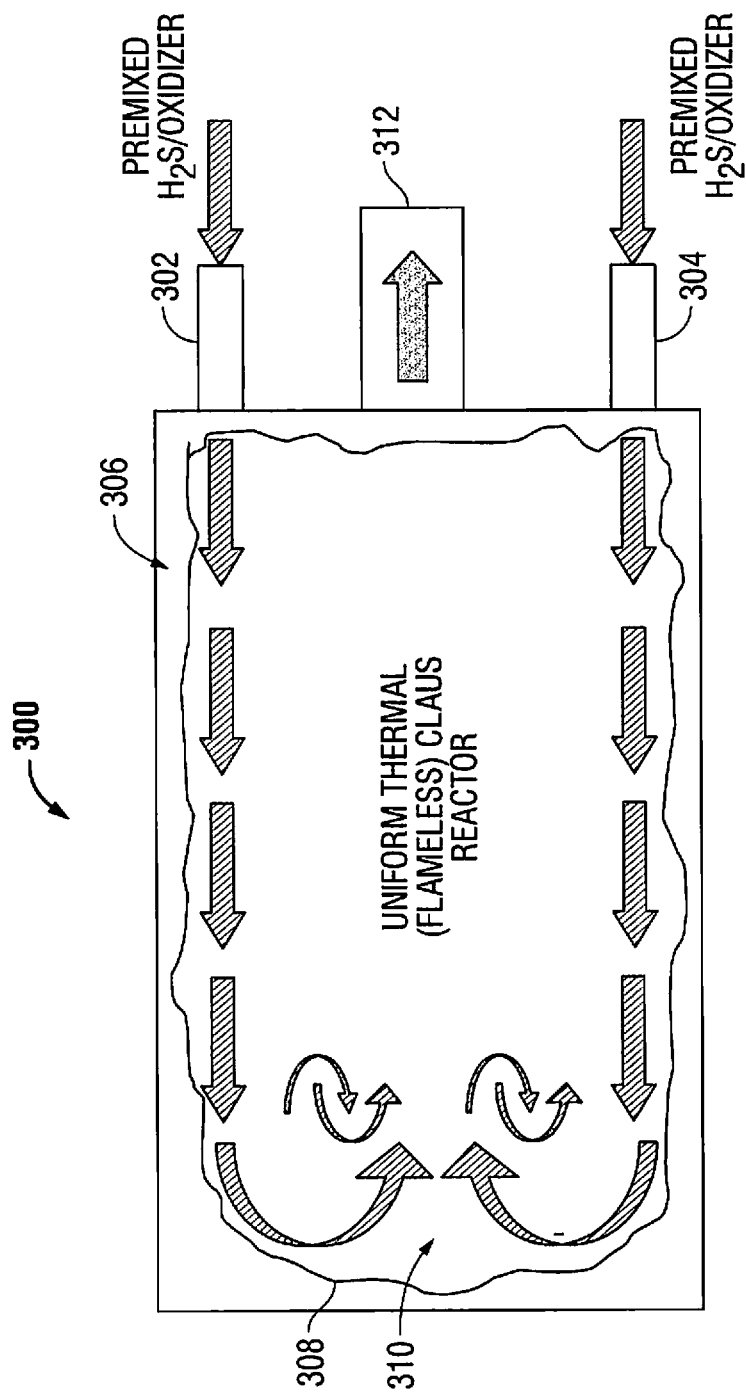

FIG. 12 illustrates an embodiment of a Claus reactor 300 similar to the embodiment shown by FIG. 11. The Claus reactor 300 has two separate input ports 302, 304 on the same side of the reactor 300. One input port 302 is used for introducing a hydrogen sulfide-oxidizer mixture into a combustion chamber 306. The other input port 304 is used for also introducing a hydrogen sulfide-oxidizer mixture into the Claus reactor 300. The hydrogen sulfide and the oxidizer are premixed. The two reactant fluids intermix at an opposite end 308 of the reactor 300 forming a uniform thermal distribution flow pattern 310. The pattern 310 occupies almost entirely the interior area of the combustion chamber 306 as shown by FIG. 12. An output port 312 is provided for the exhaust fluids to exit the combustion chamber 306.

Figure 13:
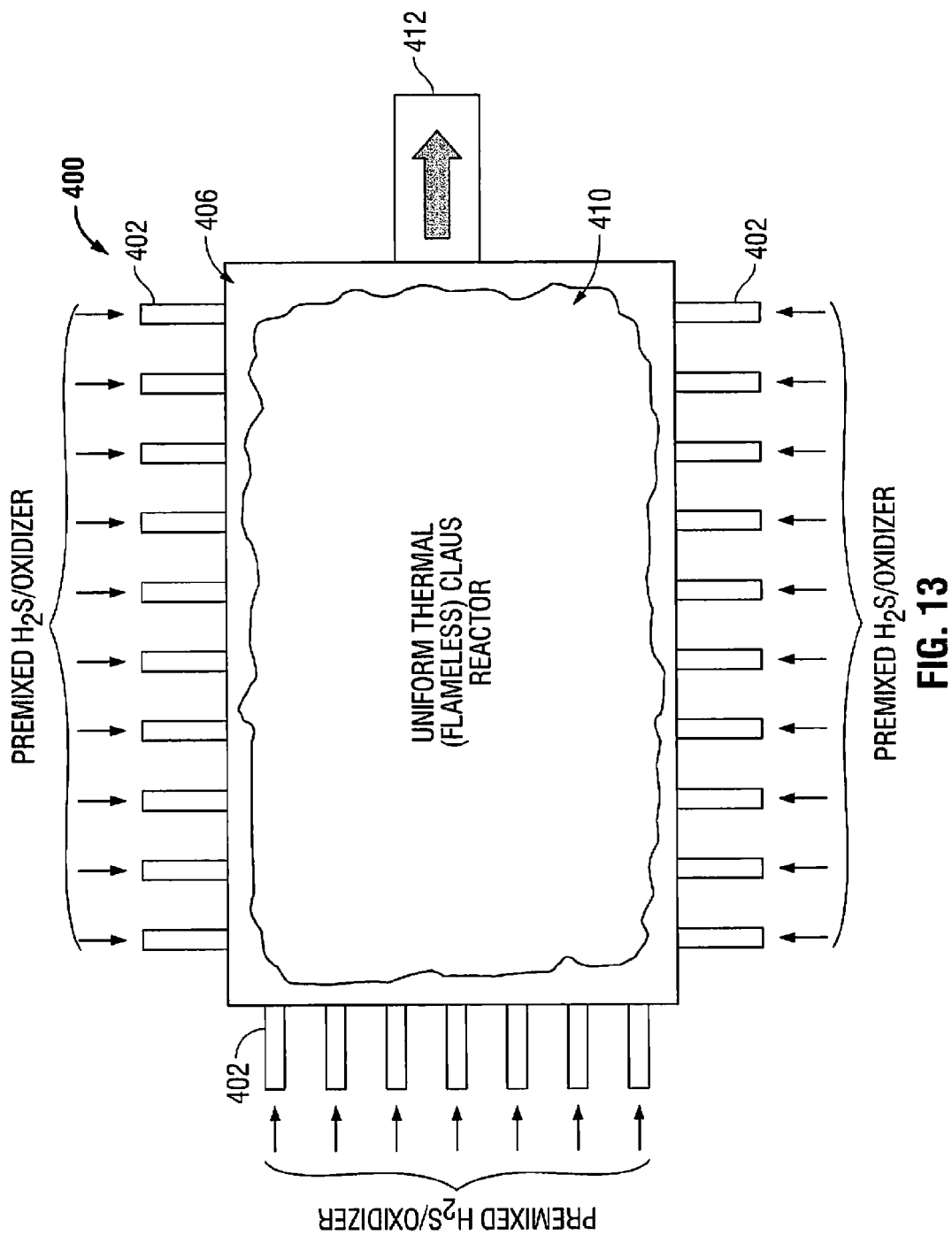

FIG. 13 illustrates an embodiment of a Claus reactor 300 designated by reference numeral 400. The Claus reactor 400 has a plurality of input ports 402 located on three sides of the reactor 400. Each input port 402 is used for introducing a hydrogen sulfide-oxidizer mixture into a combustion chamber 406. The hydrogen sulfide and the oxidizer are premixed. The two reactant fluids intermix within the combustion chamber 406 forming a uniform thermal distribution flow pattern 410. The pattern 410 occupies almost entirely the interior area of the combustion chamber 406 as shown by FIG. 13. An output port 412 is provided for the exhaust fluids to exit the combustion chamber 406.

Figure 14:
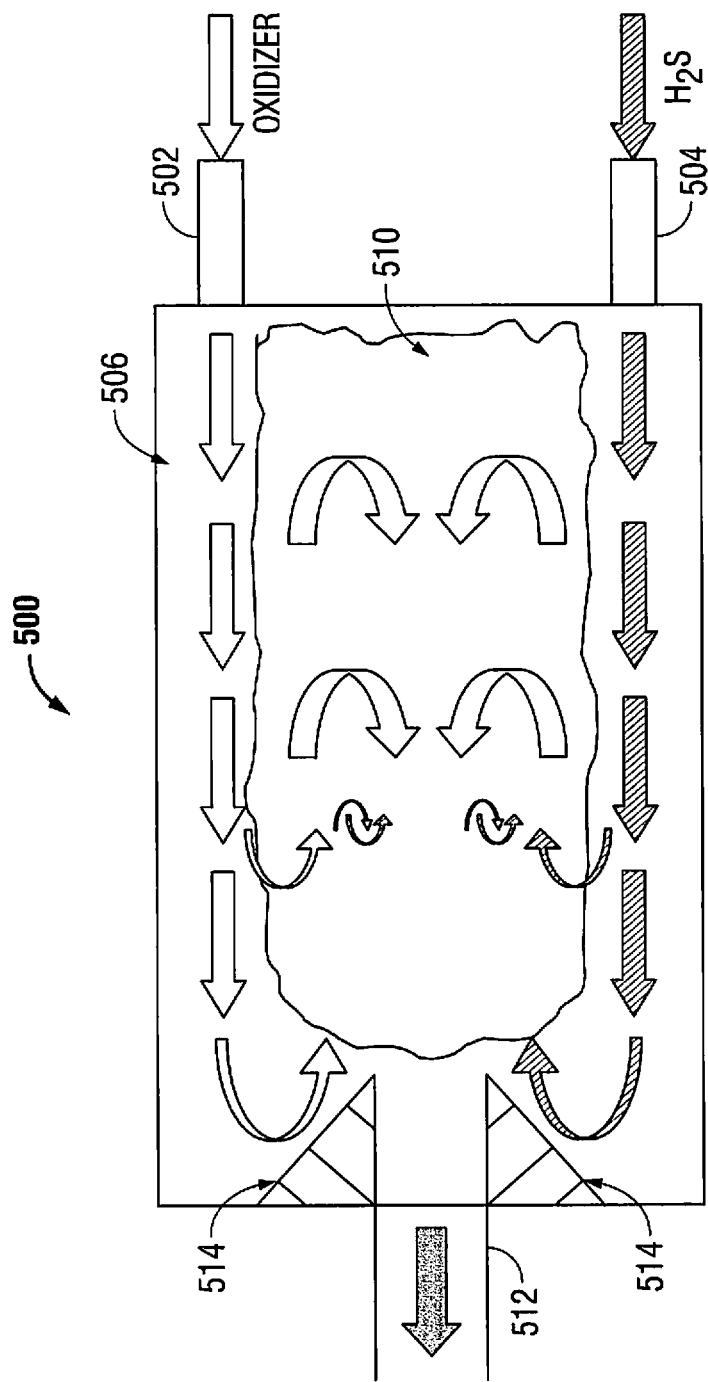

FIG. 14 illustrates an embodiment of a Claus reactor 500 similar to the embodiments shown by FIGS. 11 and 12. The Claus reactor 500 has two separate input ports 502, 504 on the same side of the reactor 500. One input port 502 is used for introducing an oxidizer into a combustion chamber 506. The other input port 504 is used for introducing hydrogen sulfide into the Claus reactor 500. The two reactant fluids intermix in a central area of the reactor 500 forming a uniform thermal distribution flow pattern 510. The pattern 510 occupies a central area of the combustion chamber 506 as shown by FIG. 14. An output port 512 is provided for the exhaust fluids to exit the combustion chamber 506. The flow pattern 510 is facilitated by the positioning of two triangular bodies 514 in proximity to the output port 512. A side of each triangular body 514 elongates the length of the output port 512 to an area within the combustion chamber 506 so that the $H_2S$ gas stream is not directed with the exhaust fluids to the output port 512.

Figure 15:
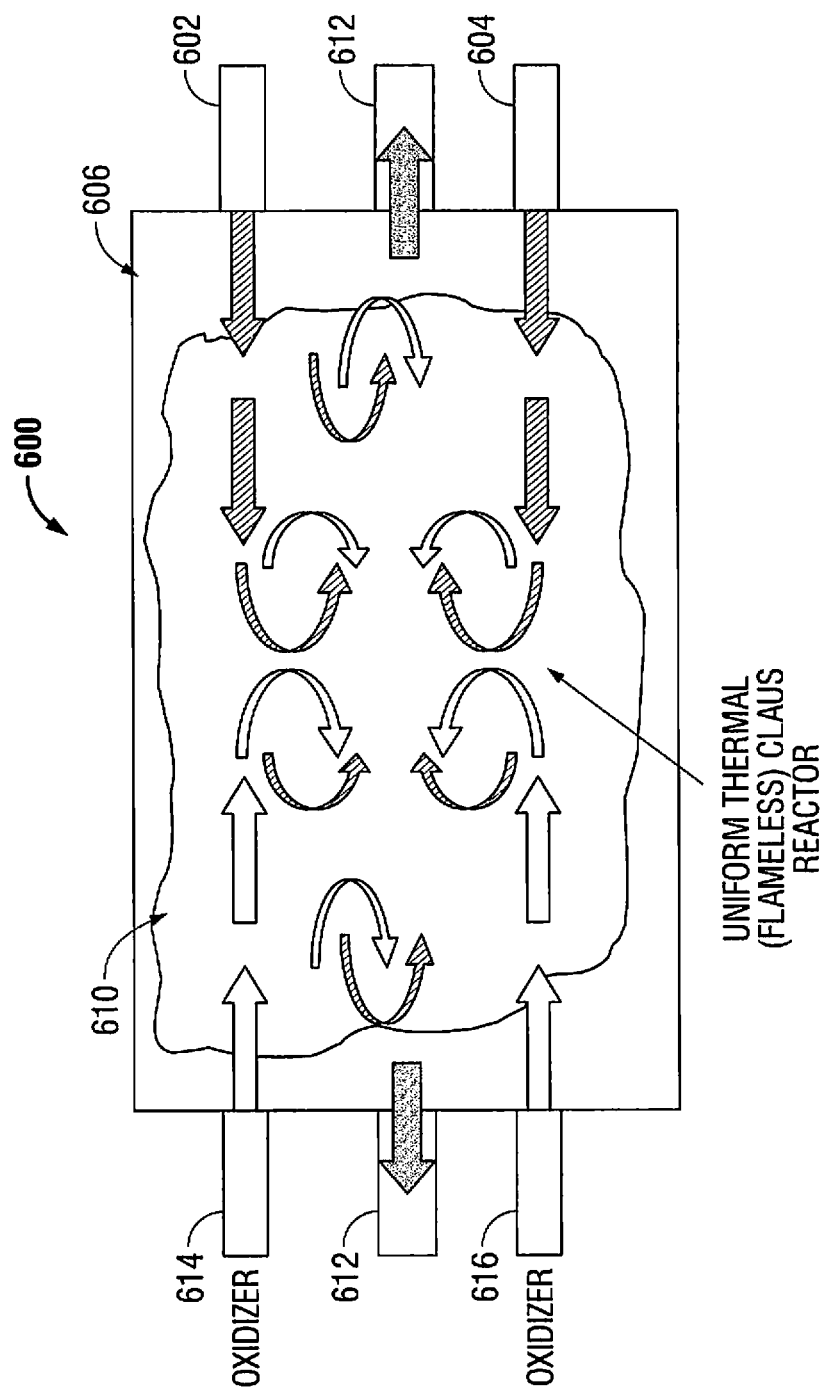

FIG. 15 illustrates an embodiment of a Claus reactor 600 having two separate input ports 602, 604 on the same side of the reactor 600 for introducing hydrogen sulfide into a combustion chamber 606. The reactor 600 also includes two separate input ports 614, 616 on an opposite side from the input ports 602, 604 for introducing an oxidizer into the combustion chamber 606. The reactant fluids intermix throughout a central area of the reactor 600 forming a uniform thermal distribution flow pattern 610. The pattern 610 is formed in the central area of the combustion chamber 606 as shown by FIG. 15. Two output ports 612 are provided on opposite ends of the reactor 600 for the exhaust fluids to exit the combustion chamber 606.

Figure 16:
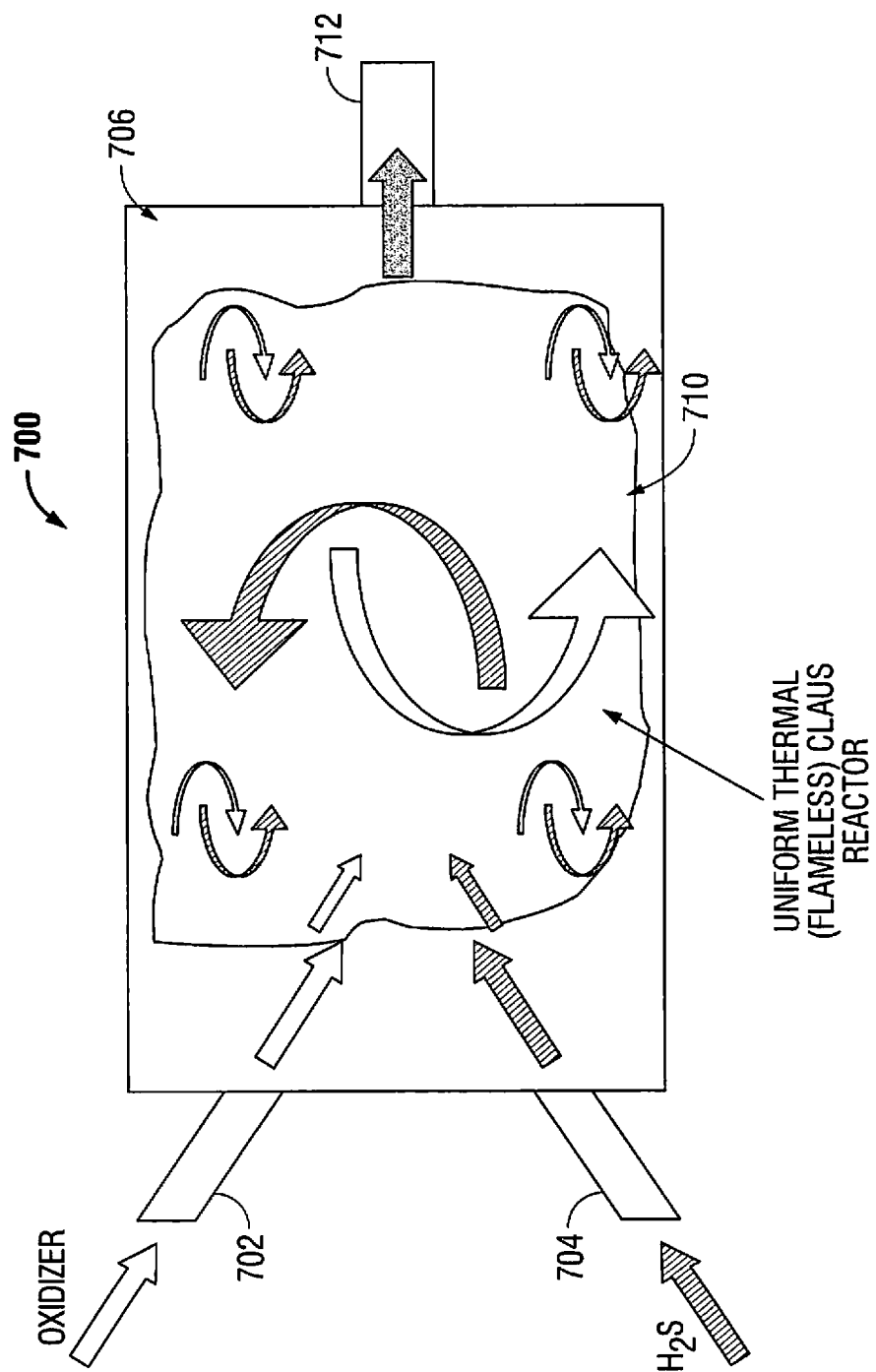

FIG. 16 illustrates an embodiment of a Claus reactor 700 having two separate input ports 702, 704 on the same side of the reactor 700 and positioned at an angle of approximately 45 degrees from a horizontal axis of the reactor 700. One input port 702 is used for introducing an oxidizer into a combustion chamber 706. The other input port 704 is used for introducing hydrogen sulfide into the Claus reactor 700. The two reactant fluids intermix at a central area of the combustion chamber 706 forming a uniform thermal distribution flow pattern 710. The pattern 710 is formed in a central area of the combustion chamber 706 as shown by FIG. 16. An output port 712 is provided for the exhaust fluids to exit the combustion chamber 706 at an end opposite the end where the input ports 702, 704 are located.

Figure 17:
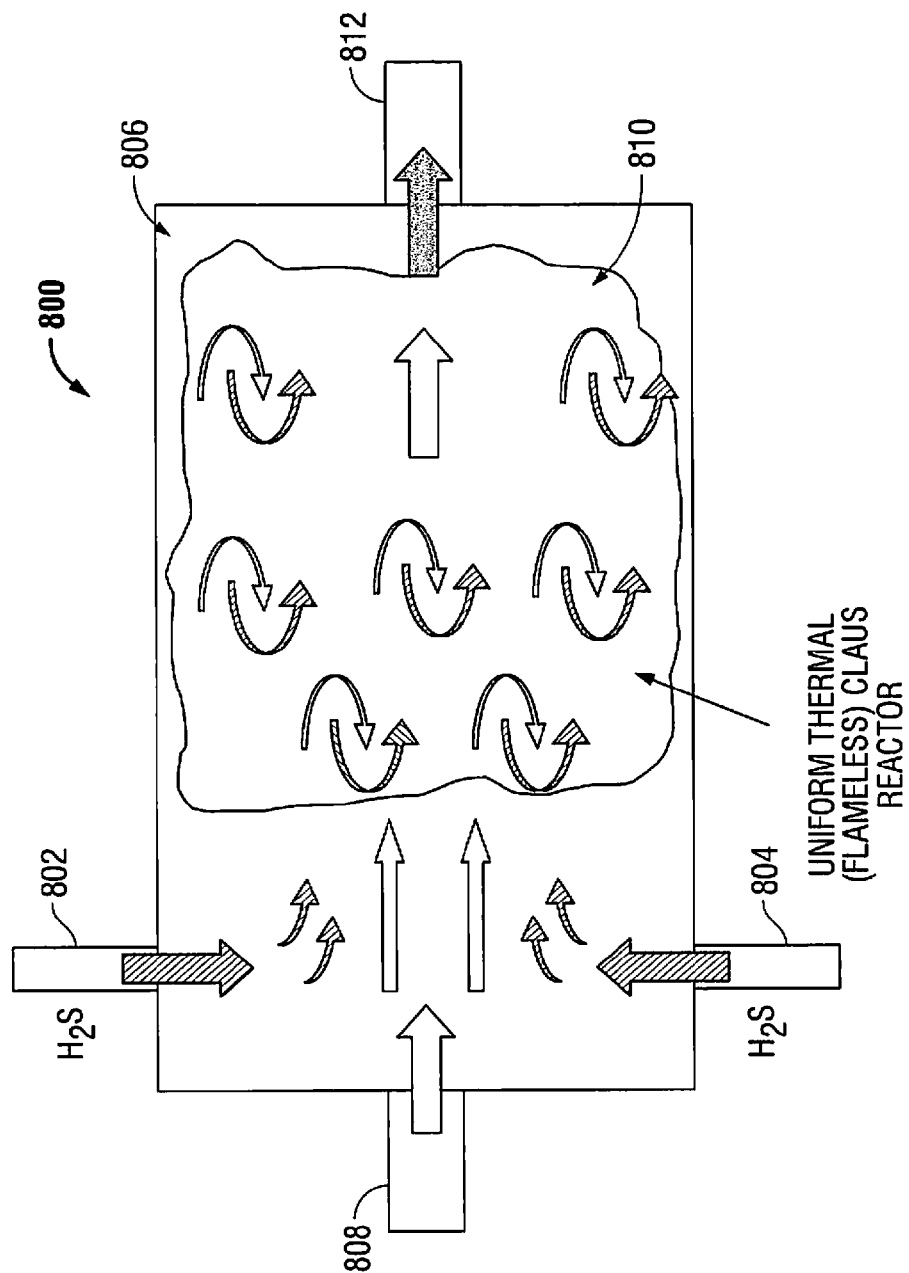

FIG. 17 illustrates an embodiment of a Claus reactor 800 having three separate input ports 802, 804, 808. Two of the input ports 802, 804 are located on two different sides opposite from each other, and one input port 808 is located at a third side. The input port 808 is used for introducing an oxidizer into a combustion chamber 806. The other input ports 802, 804 are used for introducing hydrogen sulfide into the Claus reactor 800. The two reactant fluids intermix towards the right region of the reactor 800 forming a uniform thermal distribution flow pattern 810 as shown by FIG. 17. An output port 812 is provided for the exhaust fluids to exit the combustion chamber 806. It is contemplated that obstructing bodies are placed in proximity to the input ports 802, 804 within the combustion chamber 806 for obstructing the flow of the incoming fluids and force them to be directed towards a desired direction and/or create an incoming flow pattern.

Figure 18:
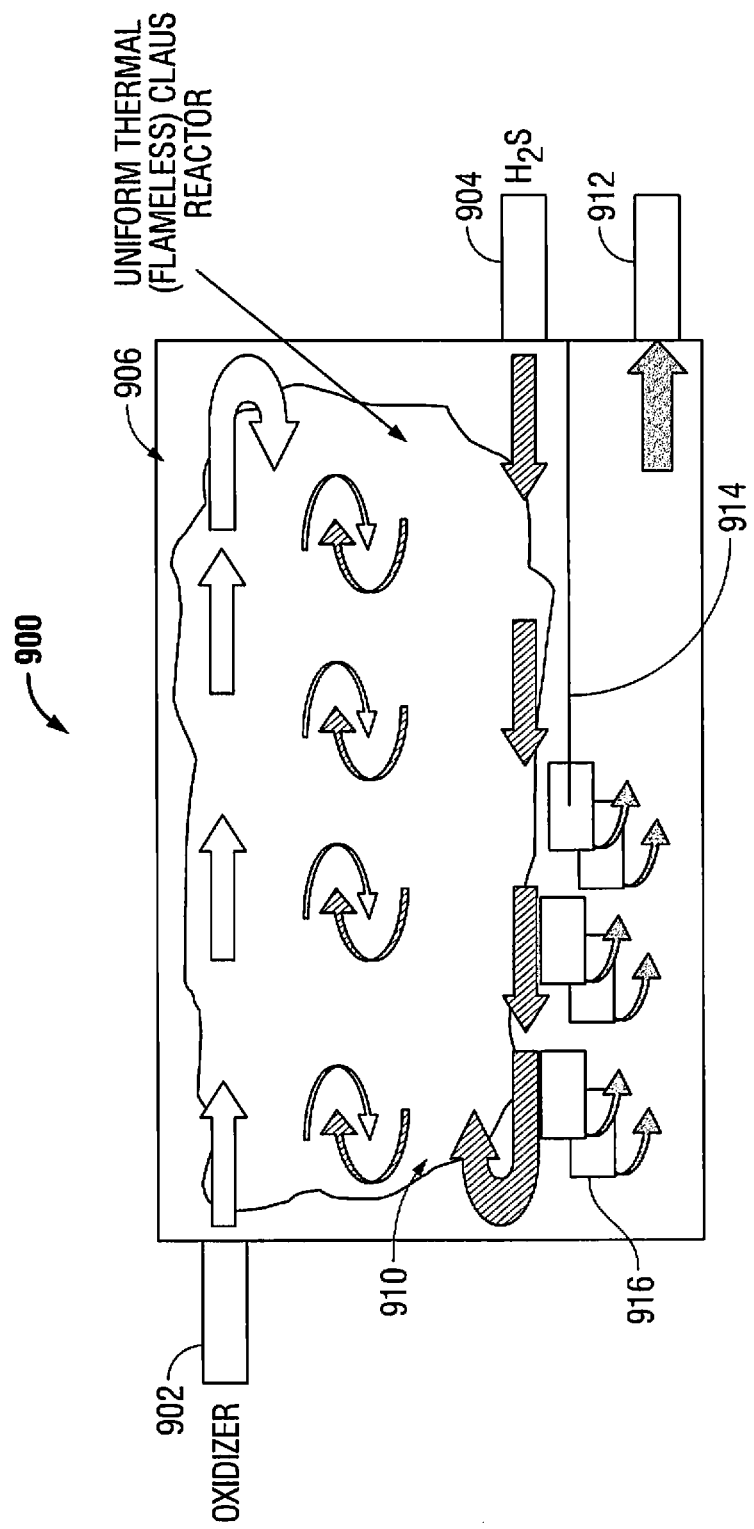

FIG. 18 illustrates an embodiment of a Claus reactor 900 having two separate input ports 902, 904 on opposite sides of the reactor 900. One input port 902 is used for introducing an oxidizer into a combustion chamber 906 from a top-left area of the combustion chamber 906. The other input port 904 is used for introducing hydrogen sulfide into the Claus reactor 900 from a bottom-right area of the combustion chamber 906. The two reactant fluids intermix forming a uniform thermal distribution flow pattern 910. The pattern 910 is formed in a central to high region of the combustion chamber 906 as shown by FIG. 18. An output port 912 is provided for the exhaust fluids to exit the combustion chamber 906. A separating wall 914 is also included to separate the area of the combustion chamber 906 where intermixing between the reactants occurs and an area of the combustion chamber 906 where no intermixing occurs. Obstructing bodies 916 are placed within the combustion chamber 906 so that the $H_2S$ gas stream is not directed with the exhaust fluids to the output port 912.

Figure 19:
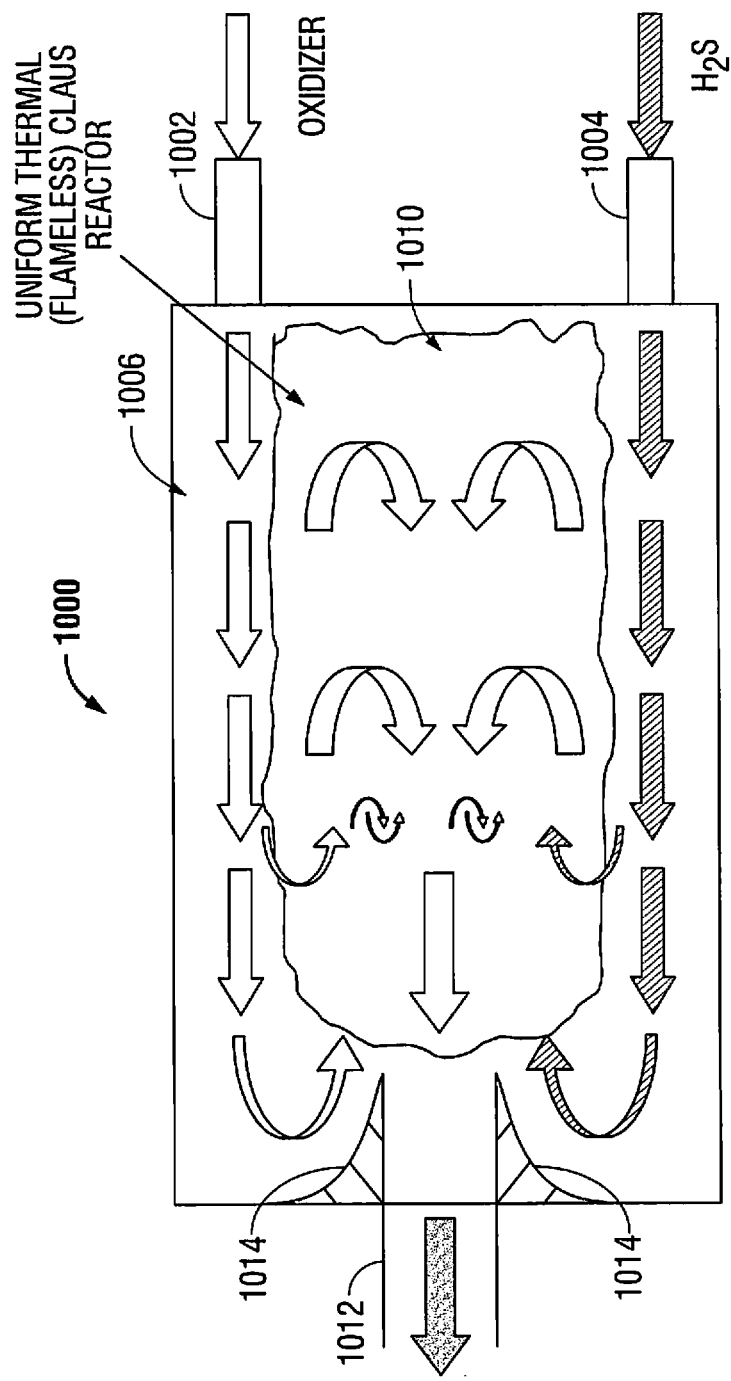

FIG. 19 illustrates an embodiment of a Claus reactor 1000 similar to the embodiment shown by FIG. 14. The Claus reactor 1000 includes two separate input ports 1002, 1004 located on the same side of the Claus reactor 1000. One input port 1002 is used for introducing an oxidizer into a combustion chamber 1006. The other input port 1004 is used for introducing hydrogen sulfide into the combustion chamber 1006. The two reactant fluids intermix in a central area of the reactor 1000 forming a uniform thermal distribution flow pattern 1010. The pattern 1010 occupies a central area of the combustion chamber 1006 as shown by FIG. 19. An output port 1012 is provided for the exhaust fluids to exit the combustion chamber 1006. The flow pattern 1010 is facilitated by the positioning of two concave bodies 1014 in proximity to the output port 1012. A side of each concave body 1014 elongates the length of the output port 1012 to an area within the combustion chamber 1006 and also causes the oxidizer and the hydrogen sulfide to be directed towards the input ports 1002, 1004.

Figure 20:
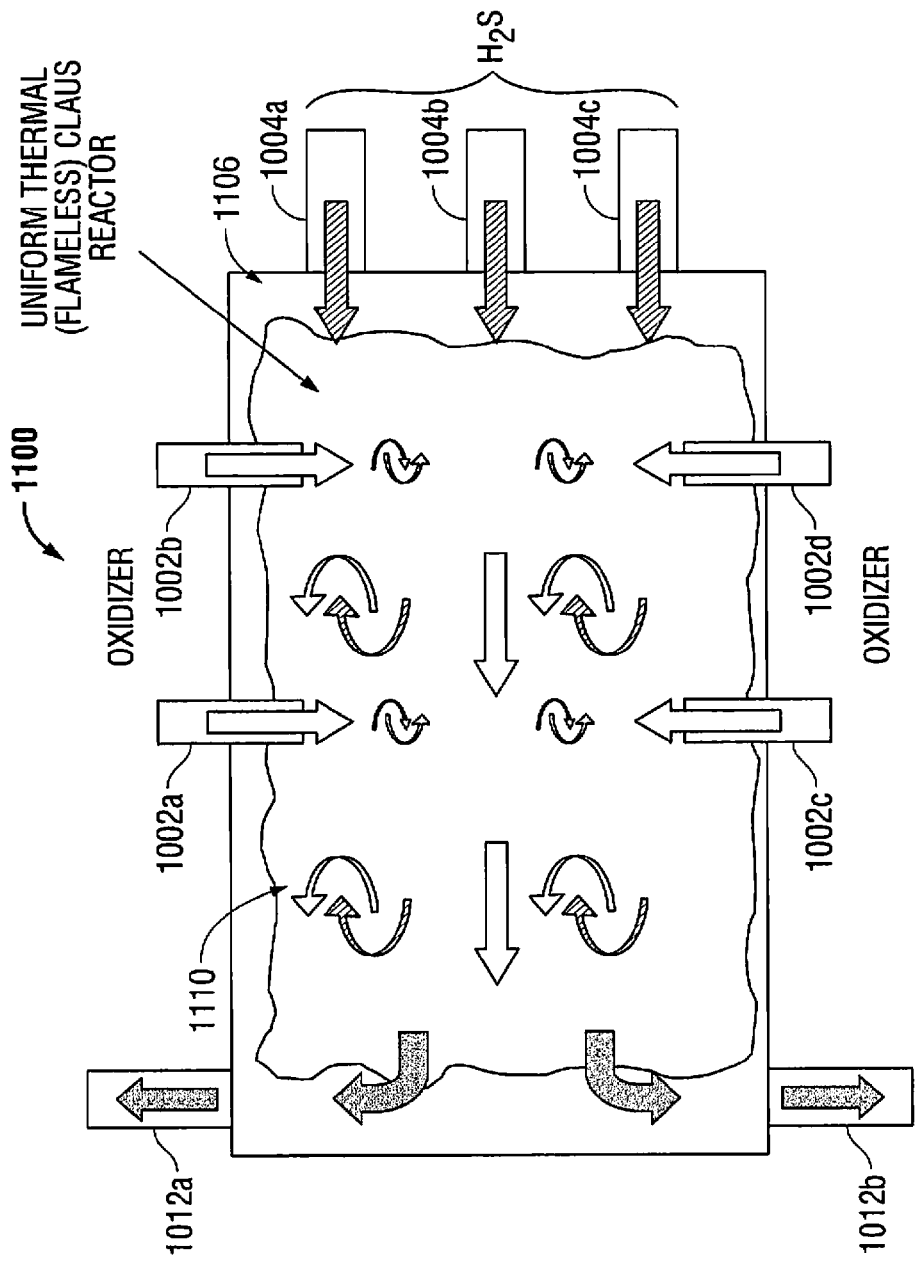

FIG. 20 illustrates an embodiment of a Claus reactor 1100 having seven separate input ports 1002a-d, 1004a-c located on two different sides of the Claus reactor 1100. Input ports 1002a-d are used for introducing an oxidizer into a combustion chamber 1106. The other input ports 1004a-c are used for introducing hydrogen sulfide into the combustion chamber 1106. The two reactant fluids intermix in a central area of the reactor 1100 forming a uniform thermal distribution flow pattern 1110. The pattern 1110 occupies a central area of the combustion chamber 1106 as shown by FIG. 20. Two output ports 1012a-b are provided for the exhaust fluids to exit the combustion chamber 1106.

Figure 21:
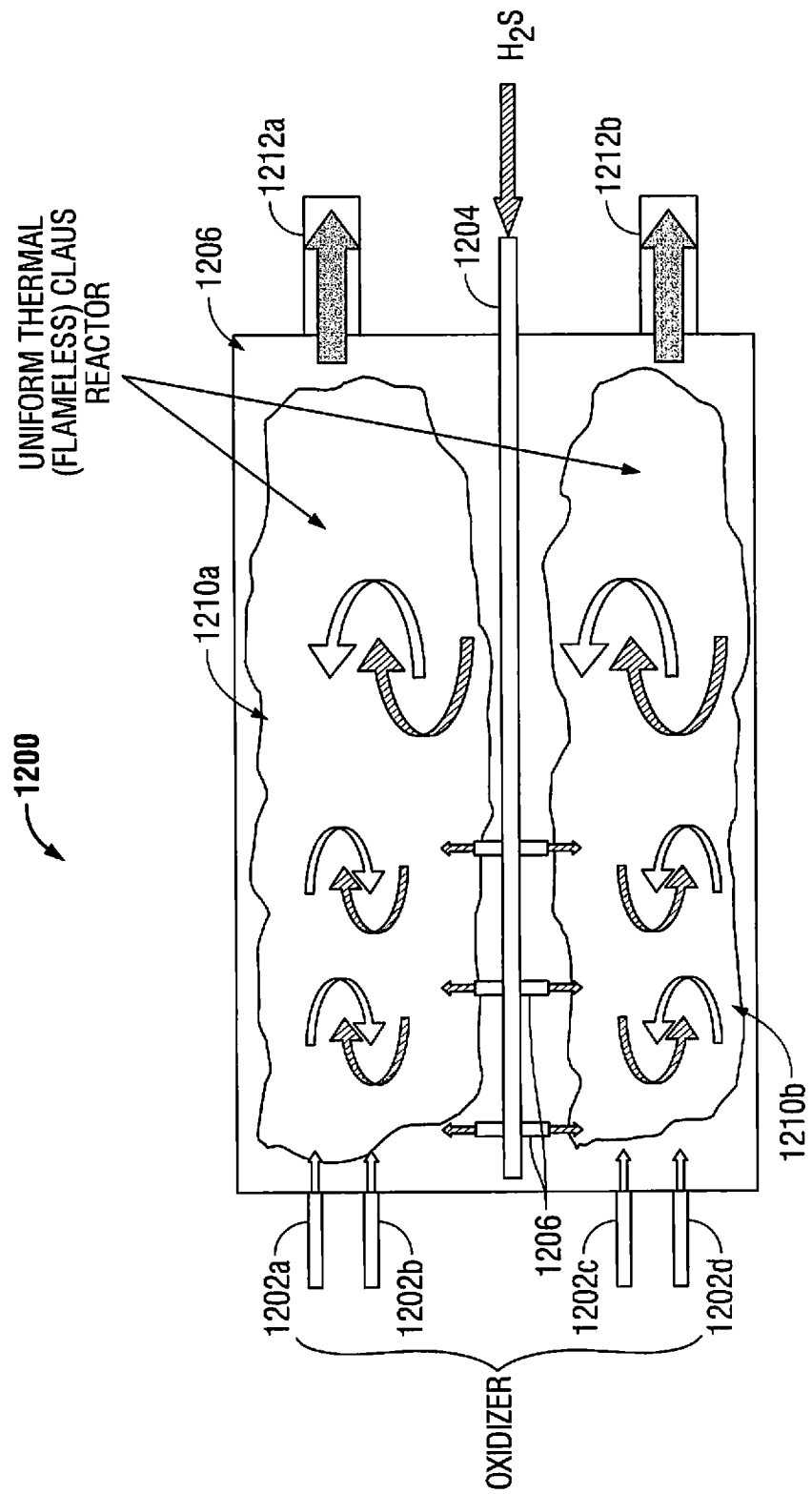

FIG. 21 illustrates an embodiment of a Claus reactor 1200 having four separate input ports 1202a-d located on one side of the Claus reactor 1200 for introducing an oxidizer into a combustion chamber 1206. There is also one other input port 1204 located on an opposite side of the Claus reactor 1200 for introducing hydrogen sulfide into the combustion chamber 1206 via six sub-input ports 1206. The two reactant fluids intermix in a central area of the reactor 1200 forming two uniform thermal distribution flow patterns 1210a-b. The patterns 1210a-b occupy a top and bottom central area of the combustion chamber 1206 as shown by FIG. 21. Two output ports 1212a-b are provided for the exhaust fluids to exit the combustion chamber 1206.

Figure 22:
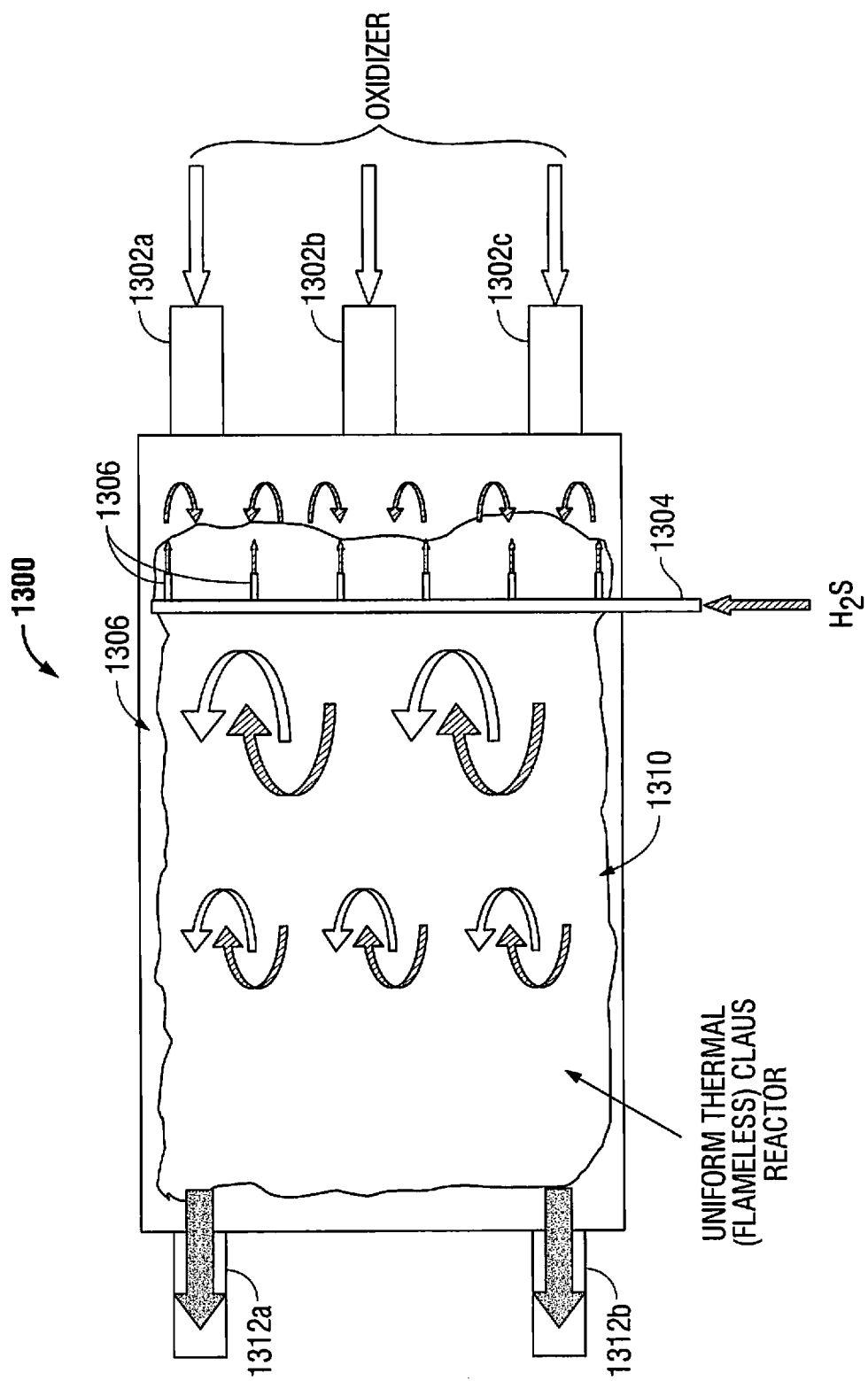

FIG. 22 illustrates an embodiment of a Claus reactor 1300 having three separate input ports 1302a-c located on one side of the Claus reactor 1300 for introducing an oxidizer into a combustion chamber 1306. There is also one other input port 1304 located on a side perpendicular to the one side of the Claus reactor 1300 for introducing hydrogen sulfide into the combustion chamber 1306 via six sub-input ports 1306. The two reactant fluids intermix in a central area of the reactor 1300 forming a uniform thermal distribution flow pattern 1310. The pattern 1300 occupies a central area of the combustion chamber 1306 as shown by FIG. 22. Two output ports 1312a-b are provided for the exhaust fluids to exit the combustion chamber 1306.

Figure 23:
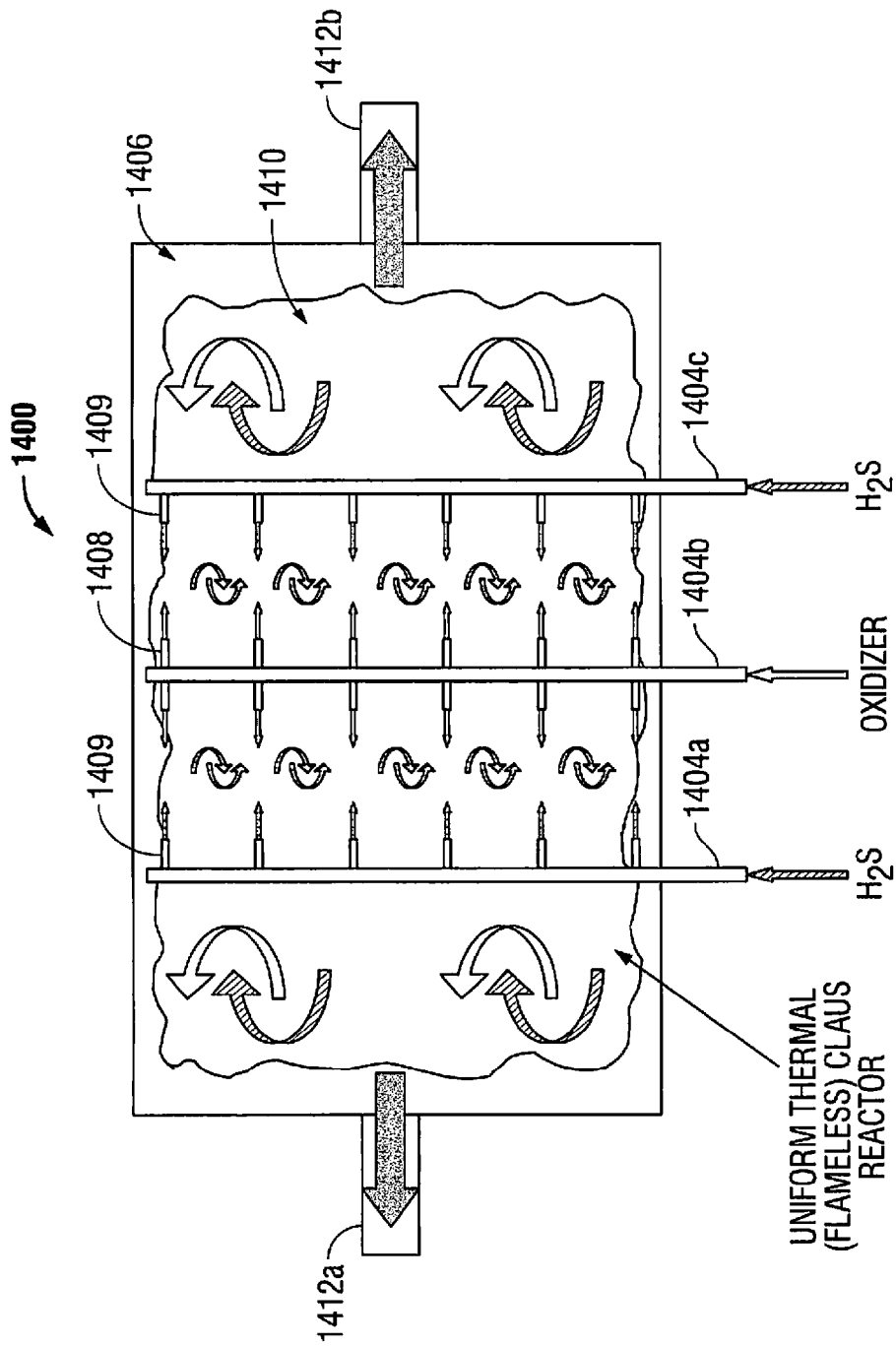

FIG. 23 illustrates an embodiment of a Claus reactor 1400 having three separate input ports 1402, 1404a-b located on one side of the Claus reactor 1400 for introducing an oxidizer into a combustion chamber 1406 via input port 1402 and hydrogen sulfide via input ports 1404a-b. There are twelve sub-input ports 1408 for input port 1402 and six sub-input ports 1409 for each of input port 1404a-b. The two reactant fluids intermix in a central area of the reactor 1400 forming a uniform thermal distribution flow pattern 1410. The pattern 1400 occupies a central area of the combustion chamber 1406 as shown by FIG. 23. Two output ports 1412a-b are provided on opposite sides from each other for the exhaust fluids to exit the combustion chamber 1406.

It can be seen from the embodiments described above that the uniform thermal distribution flow patterns can be formed based on the number of input ports for the oxidizer and for the hydrogen sulfide, and/or the interior design of the combustion chamber. Accordingly, the uniform thermal distribution flow pattern(s) for a Claus reactor according to the present disclosure can be controlled based on the design of the flameless Claus reactor.

II. Conclusions

A new sulfur recovery process from acid gases is described above and claimed below that provides much higher efficiency than the more commonly used Claus flame thermal reactor. The conventional and modified Claus process and its derivatives have been presented and discussed, each with distinct advantages. It is shown that any improvements towards high sulfur recovery cause very high cost additions to an already economically deficient process.

The Claus reactor according to the present disclosure features greater yield of sulfur and chemical energy without any environmental impact. The lean acid gases provide complete sulfur recovery from more conventional stream while controlled well mixed advanced Claus reactor provides high yield of sulfur recovery under conditions of fuel-rich acid gas composition. Therefore, the technology according to the present disclosure features a new way for the efficient low cost removal of chemically bound sulfur in the gas to sulfur and chemical energy, thus reducing the complexity and the cost of the more traditional Claus sulfur recovery process.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A reactor of the type configured for performing the Claus process comprising:
    a combustion chamber;
    a plurality of first input ports for introducing a fluid containing hydrogen sulfide into the combustion chamber;
    a plurality of second input ports for introducing an oxidizer fluid into the combustion chamber for reacting with the fluid containing hydrogen sulfide;
    means for pre-heating the oxidizer fluid and being in fluid communication with the plurality of second input ports;
    at least one output port in fluid communication with the combustion chamber for exhausting fluids out of the combustion chamber; and
    means for controlling the introduction of said oxidizer fluid into the combustion chamber for controlling formation of a thermal distribution flow pattern within the combustion chamber, wherein the thermal distribution flow pattern operates as an induced jet pump for circulating the fluids within the combustion chamber.

2. The reactor according to claim 1, wherein the plurality of first input ports and the plurality of second input ports are the same input ports.

3. The reactor according to claim 1, wherein the plurality of first input ports and the plurality of second input ports are different input ports.

4. The reactor according to claim 1, wherein the plurality of first input ports and the plurality of second input ports are in fluid communication with each other external to said combustion chamber.

5. The reactor according to claim 1, wherein one of the plurality of second input ports and the combustion chamber include means for causing fluids to be directed towards a predetermined direction.

6. The reactor according to claim 5, wherein said means for causing fluids to be directed towards a predetermined direction includes a body positioned within one of the plurality of second input ports and the combustion chamber.

7. The reactor according to claim 1, wherein the plurality of first input ports and the plurality of second input ports are positioned in a location selected from a group consisting of on the same side of the reactor, on opposite sides of the reactor, at sides perpendicular to each other, and at a predetermined angle with respect to each other.

8. The reactor according to claim 1, wherein said reactor is characterized as a High Temperature Air Combustion reactor.

9. A reactor of the type configured for performing the Claus process comprising:
- a combustion chamber;
- means for introducing a fluid containing hydrogen sulfide into the combustion chamber;
- means for introducing an oxidizer fluid into the combustion chamber for reacting with the fluid containing hydrogen sulfide;
- means for pre-heating the oxidizer fluid and being in fluid communication with the at least one second input port;
- means for exhausting fluids out of the combustion chamber; and
- means for controlling the introduction of said oxidizer fluid into the combustion chamber for controlling formation of a thermal distribution flow pattern within the combustion chamber, wherein the thermal distribution flow pattern operates as an induced jet pump for circulating the fluids within the combustion chamber.

10. The reactor according to claim 9, wherein said reactor is characterized as a High Temperature Air Combustion reactor.

11. A method for performing the Claus process within a reactor comprising:
- introducing a fluid containing hydrogen sulfide into a combustion chamber of the reactor;
- controlling the introduction of a pre-heated oxidizer fluid into the combustion chamber for forming a thermal distribution flow pattern within the combustion chamber, wherein the thermal distribution flow pattern operates as an induced jet pump for circulating the fluids within the combustion chamber; and
- chemically reacting the fluid containing hydrogen sulfide and the pre-heated oxidizer within the combustion chamber.

12. The method according to claim 11, further comprising positioning a body within the combustion chamber for causing the two fluids to be directed in a particular direction.

13. The method according to claim 11, wherein said reactor is characterized as a High Temperature Air Combustion reactor.

14. A reactor of the type configured for performing the Claus process comprising:
- a combustion chamber;
- at least one first input port for introducing a fluid containing hydrogen sulfide into the combustion chamber;
- at least one second input port for introducing an oxidizer fluid into the combustion chamber for reacting with the fluid containing hydrogen sulfide;
- means for pre-heating the oxidizer fluid and being in fluid communication with the at least one second input port;
- at least one output port in fluid communication with the combustion chamber for exhausting fluids out of the combustion chamber; and
- wherein the at least one first input port and the at least one second input port are positioned at a respective first and second location with respect to the combustion chamber for controlling the formation of a thermal distribution flow pattern within the combustion chamber.

15. The reactor according to claim 14, wherein the at least one first input port and the at least one second input port are the same input port.

16. The reactor according to claim 14, wherein the at least one first input port and the at least one second input port are different input ports positioned at approximately a 45 degree angle with respect to a horizontal axis there between.

17. The reactor according to claim 14, wherein one of the at least one second input port and the combustion chamber include means for causing fluids to be directed towards a predetermined direction.

18. The reactor according to claim 17, wherein said means for causing fluids to be directed towards a predetermined direction includes a body positioned within said one of the at least one second input port and the combustion chamber.

19. The reactor according to claim 14, wherein at least one of the first input port and the second input port include sub-input ports positioned within the combustion chamber.

20. The reactor according to claim 1, wherein said reactor is characterized as a High Temperature Air Combustion reactor.

21. A method for performing the Claus process within a reactor comprising:
- introducing a fluid containing hydrogen sulfide into a combustion chamber of the reactor;
- introducing a pre-heated oxidizer fluid into the combustion chamber;
- reacting the fluid containing hydrogen sulfide and the pre-heated oxidizer within to the combustion chamber; and
- controlling the formation of a thermal distribution flow pattern within the combustion chamber based on direction of fluid flow of the fluid containing hydrogen sulfide and the pre-heated oxidizer fluid and position from where the two fluids are introduced into the combustion chamber.

22. The method according to claim 21, wherein the step of controlling the formation of the thermal distribution flow pattern comprises the step of positioning a body within the combustion chamber for causing the two fluids to be directed in a particular direction.

23. The method according to claim 21, further comprising premixing the oxidizer fluid and the fluid containing hydrogen sulfide prior to being introduced into the combustion chamber.

24. The method according to claim 19, wherein said reactor is characterized as a High Temperature Air Combustion reactor.

* * * * *